(12) United States Patent
Walters, Jr.

(10) Patent No.: US 10,982,386 B2
(45) Date of Patent: Apr. 20, 2021

(54) MOBILE DEVICE ELASTOMERIC SUPPORT STRAP WITH VISIBLY IDENTIFIABLE EXPANDABLE LOGO IMPRINTS

(71) Applicant: INNOVODUCTS, LLC, Woodbridge, CT (US)

(72) Inventor: Lawrence S. Walters, Jr., Woodbridge, CT (US)

(73) Assignee: Innovoducts, LLC, Woodbridge, CT (US)

(*) Notice: Subject to any disclaimer, the term of this patent is extended or adjusted under 35 U.S.C. 154(b) by 40 days.

(21) Appl. No.: 16/420,887

(22) Filed: May 23, 2019

(65) Prior Publication Data

US 2020/0370241 A1    Nov. 26, 2020

(51) Int. Cl.
  *H04M 1/00* (2006.01)
  *D06P 5/20* (2006.01)
  (Continued)

(52) U.S. Cl.
  CPC ............ *D06P 5/2083* (2013.01); *A45C 11/00* (2013.01); *A45F 5/00* (2013.01); *D06P 5/2027* (2013.01);
  (Continued)

(58) Field of Classification Search
  CPC ...... D06P 5/2083; D06P 5/2072; A45C 11/00; A45C 2011/002; H04B 1/3888; H04M 1/0202; A45F 2200/0516
  (Continued)

(56) References Cited

U.S. PATENT DOCUMENTS 8,746,448 B1 * 6/2014 Bellace .................. A45F 5/00
                                                206/320
8,950,638 B2   2/2015 Wangercyn, Jr. et al.
                       (Continued)

FOREIGN PATENT DOCUMENTS

CA    2885434 A1    9/2015
CA    3026682 A1    9/2015
                 (Continued)

OTHER PUBLICATIONS

International Search Report dated Aug. 26, 2019 from corresponding International Patent Application No. PCT/US2019/033744, 5 pages.

(Continued)

*Primary Examiner* — Marceau Milord
(74) *Attorney, Agent, or Firm* — Ohlandt, Greeley, Ruggiero & Perle, L.L.P.

(57) ABSTRACT

A method for infiltrating a substance into a heterogeneous solid of a material of an elastomeric strap to form a logo that includes providing a permeating substance and a heterogeneous solid of the elastomeric strap. The heterogeneous solid comprises a first region, a second region, and an interface region interposed between the first region and the second region. The method also includes applying an energy to the heterogeneous solid with the energy of an amount sufficient to render the interface region temporarily permeable; applying a driving force configured to infiltrate the permeating substance into the interface region to form the logo; and, modifying the application of the energy, thereby rendering the interface region impermeable and causing a portion of the permeating substance to disperse into the first region.

21 Claims, 17 Drawing Sheets

(51) Int. Cl.
*A45C 11/00* (2006.01)
*A45F 5/00* (2006.01)
*H04M 1/02* (2006.01)
*H04B 1/3888* (2015.01)

(52) U.S. Cl.
CPC .......... *D06P 5/2072* (2013.01); *H04B 1/3888* (2013.01); *H04M 1/0202* (2013.01); *A45C 2011/002* (2013.01); *A45F 2200/0516* (2013.01)

(58) Field of Classification Search
USPC ................... 455/575.1, 575.8, 90.3, 566
See application file for complete search history.

(56) References Cited

U.S. PATENT DOCUMENTS

| | | | |
|---|---|---|---|
| 9,027,808 B2* | 5/2015 | Kim | A45F 5/00 224/218 |
| D735,695 S | 8/2015 | Murphy | |
| D735,795 S | 8/2015 | Murphy | |
| 9,219,516 B2* | 12/2015 | Haymond | H04B 1/3888 |
| 9,242,127 B1* | 1/2016 | London, Sr. | A62B 35/0018 |
| 9,259,077 B2* | 2/2016 | Murphy | F16M 13/00 |
| 9,300,347 B1* | 3/2016 | Coverstone | G06F 3/043 |
| 9,407,743 B1* | 8/2016 | Hirshberg | B62J 11/00 |
| 9,438,299 B2* | 9/2016 | Haymond | B65D 25/00 |
| 9,705,552 B1* | 7/2017 | Tall | H04B 1/385 |
| 9,958,107 B1 | 5/2018 | Hobbs et al. | |
| 9,970,589 B2 | 5/2018 | Hobbs et al. | |
| 9,979,428 B2* | 5/2018 | Tomobe | H04B 1/385 |
| 10,030,807 B1 | 7/2018 | Hobbs et al. | |
| 10,060,573 B2 | 8/2018 | Hobbs et al. | |
| 10,215,329 B2 | 2/2019 | Hobbs et al. | |
| 10,317,005 B2 | 6/2019 | Hobbs et al. | |
| 10,389,009 B2 | 8/2019 | Lee et al. | |
| 10,455,927 B2 | 10/2019 | Brousseau | |
| 10,469,640 B2* | 11/2019 | Gartz | F16M 13/04 |
| 10,554,798 B2* | 2/2020 | Britt | H04M 1/18 |
| 2009/0219677 A1 | 9/2009 | Mori | |
| 2011/0122554 A1* | 5/2011 | Ramrattan | G03B 17/00 361/679.01 |
| 2011/0173060 A1* | 7/2011 | Gallagher | G06Q 30/0226 705/14.27 |
| 2011/0266316 A1 | 11/2011 | Ghalib | |
| 2011/0309117 A1 | 12/2011 | Roberts | |
| 2012/0048873 A1 | 3/2012 | Hyseni | |
| 2012/0299318 A1 | 11/2012 | Murphy | |
| 2013/0149964 A1* | 6/2013 | Kreiner | G06F 1/1632 455/41.2 |
| 2013/0240380 A1* | 9/2013 | Hansen | A45F 5/00 206/37 |
| 2013/0249358 A1* | 9/2013 | Stevenson | H05K 5/0004 312/223.1 |
| 2014/0084035 A1* | 3/2014 | Georges | A45F 5/00 224/267 |
| 2014/0127477 A1 | 5/2014 | Grier, II | |
| 2014/0152034 A1* | 6/2014 | Tussy | F16M 13/04 294/142 |
| 2014/0202886 A1* | 7/2014 | Kim | A45F 5/00 206/38 |
| 2014/0217135 A1 | 8/2014 | Murphy | |
| 2015/0009610 A1 | 1/2015 | London | |
| 2015/0201743 A1 | 7/2015 | Erickson-Davis | |
| 2015/0288406 A1* | 10/2015 | Haymond | A45C 13/30 455/575.6 |
| 2015/0305480 A1* | 10/2015 | Brousseau | B25G 3/00 224/267 |
| 2015/0335138 A1 | 11/2015 | Juarbe | |
| 2015/0365125 A1 | 12/2015 | Murphy | |
| 2016/0007723 A1 | 1/2016 | Georges | |
| 2016/0088924 A1* | 3/2016 | Haymond | A45F 5/00 224/218 |
| 2016/0100675 A1 | 4/2016 | Dong | |
| 2016/0102430 A1 | 4/2016 | Grier | |
| 2016/0134733 A1 | 5/2016 | Murphy | |
| 2016/0233909 A1 | 8/2016 | West | |
| 2017/0079380 A1* | 3/2017 | Wojcieszak | A43C 11/004 |
| 2017/0238645 A1* | 8/2017 | Arin | A43B 23/24 |
| 2017/0373713 A1 | 12/2017 | Hirsch | |
| 2018/0048342 A1 | 2/2018 | Curcio | |
| 2018/0338022 A1* | 11/2018 | Penfold | H04M 1/0264 |
| 2019/0008256 A1* | 1/2019 | Basham | A45C 3/02 |
| 2019/0183401 A1* | 6/2019 | Witzigreuter | A61M 21/02 |
| 2019/0357661 A1* | 11/2019 | Walters, Jr. | A45F 5/00 |

FOREIGN PATENT DOCUMENTS

| | | |
|---|---|---|
| GB | 2514345 A | 11/2014 |
| JP | 2003111611 A | 4/2003 |

OTHER PUBLICATIONS

Written Opinion dated Aug. 26, 2019 from corresponding International Patent Application No. PCT/US2019/033744, 11 pages.
Strech Shapes, "Dye Sublimation Printing on Stretch Fabric", https://www.stretchshapes.net/dye-sublimation-printing-stretch-fabric/>, Jun. 8, 2017.
Hu, Sinbo; "Lycra Double Covering Machine", Mar. 26, 2016, https://www.youtube.com/watch?v-FfapQc5RIbs.

* cited by examiner

MOBILE DEVICE ELASTOMERIC SUPPORT STRAP WITH VISIBLY IDENTIFIABLE EXPANDABLE LOGO IMPRINTS

BACKGROUND OF THE DISCLOSURE

1. Field of the Disclosure

The present disclosure relates to accessories for mobile devices, and particularly smartphones. More particularly, the present disclosure relates to an elastomeric support strap with a visibly identifiable/recognizable expandable logo imprint. This support strap is presented with many valuable features: (i) a thin, flexible, elastic, and comfortable structure, (ii) a quick and secure fastening system, (iii) it is adjustable and customizable, (iv) it is convenient and readily accessible for immediate use, (v) it is easy to install and remove, (vi) it improves the user's ability to hold and operate the device, and (vii) it provides a means for corporate promotion and personal expression, all of which will be immediately appreciated upon use. As used herein, the use of the terms "logo", "logos", or "logoed" shall mean all distinguishing markings and/or designs, in one or more colors or any combination of colors, including, all names of companies and organizations (both for profit and non-profit), brands, symbols, icons, website URLs, and any picture, pattern, drawing, illustration, expression, tagline, slogan, message, artwork, or other graphic that can be replicated on one or both sides of the strap. Such logos will allow the user a means of personal expression by displaying a design that has meaning to them. In addition, such logos will allow the corporate/organizational sponsor to access a new venue with unprecedented advertising and promotional value, and allow their supporters a means to voice support for their favorite company, brand, sports team, non-profit organization, charity, cultural, educational, historical or religious institution, mission, candidate, cause, or other passion, as they may desire.

2. Description of the Related Art

The use of smartphones has had an enormous impact on the way most people live in the United States and in other civilized and emerging countries around the world. Smartphone sales have been steadily increasing since their introduction with nearly 1.54 billion sold in 2017 at an estimated $478.7 billion. (hrrps://www.statista.com/statistics/263437/global-smartphone-sales-to-end-users-since-2007/; https://www.statistacom/statistics/237505/lobal-revenue-from-smartphones-since-2008/) With over 1.80 billion smartphones estimated to be shipped in 2018, emerging markets are now taking the lead, with China and India projected to account for 37% of all shipments worldwide by 2019. (https://www.statista.com/statistics/271491/worldwide-shipments-of-smartphones-since-2009/) Smartphone users account for over 36% of the world's population in 2018, reaching a projected 2.87 billion people by 2020. (https/www.statista.com/statistics/330695/number-of-smartphone-users-worldwide/) In fact, by 2020 half of the Chinese population is projected to be using smartphones. (https://www.statista.com/statistics/330695/number-of-smartphone-users-worldwide/) With approximately 2.8 million apps available for Android devices and 2.2 million for iPhones (https://www.statista.com/statistics/276623/number-of-apps-available-in-leading-app-stores/), smartphones are now used for almost everything one would use a computer for, including news and communication, reading and education, research, entertainment, music, movies, games, retail purchases, directions, scheduling, productivity, photography, recording, etc. With this level of functionality, it is common knowledge that people check their smartphones frequently throughout the day for many different purposes. In fact, according to a 2013 Internet Trends report by Kleiner Perkins Caufield and Byers, a typical user checks their smartphone approximately 150 times a day. This report found that among other uses, people, on average, check their phones 23 times a day for messaging, 22 times for voice calls, and 18 times to learn the time. (https://www.slideshare.net/larryss/clipboards/number-of-times-per-day-that-users-check-their-phones) Another study found that people check their phones most often between 5 PM and 8 PM when more than 75% of people unlock their phones and actively use them. American adults spend 3-5 hours every day on their smartphones with social media, mobile messaging, and various apps consuming most of the time. (https://hackernoon.com/ihow-much-time-do-people-spend-on-their-mobile-phones-in-2017-e5f90a0b10a6).

Once users check their smartphones, they often interact with it extensively. In fact, adults touch their smartphone 2,617 times per day (5,427 for the heaviest users). (https://www.networkworld.com/articie/3092446/smartphones/we-touch-our-phones-2617-times-a-day-says-study.html).

Many users check their smartphones habitually, with 55% of adults using their smartphone in short bursts of less than 30 seconds of activity. (https://www.huffingtonpost.com/entry/smartphone-usage-estimates us 5637687de4b0631799-12dc96). 71% of Americans sleep with their smartphone on a nightstand or in their bed, and 3% hold the smartphone in their hands while sleeping. (http://fortune.com/2015/06/29/sleep-bank-smartphones/). More than half of Americans, approximately 57%, report that they use their smartphone at least once an hour and this number increases significantly in California and New York, where the statistics jump to 88% and 96%, respectively. (http://fortune.com/2015/06/29/sleep-banks-smartphones/

Some additional information regarding smartphone ownership includes: 77% of U.S. adults own a smartphone (http://www.pewresearch.org/fact-tank/2017/06/28/10-facts-about-smartphones/); 224.3 million in 2017 growing to 270.7 million by 2022 (http://www.statista.com/statistics/201182/forecast-of-smartphone-users-in-the-us/); 92% for those 18-29 year olds; 42% for those 65 and older; and 64% of lower income Americans own a smartphone (>$30,000/yr). (http://www.pewresearch.org/fact-tank/2017/06/28/10-facts-about-smartphones/) Adults use smartphones for a variety of tasks: job search-28%; dating 9%; reading an e-book 13%; shopping 51%; news alerts-55%, and 46% of adults stated that they couldn't live without a smartphone. (http://www.pewresearch.org/fact-tank/2017/06/28/10-facts-about-smartphones/). In fact, a surprising 79% of people use their smartphone for reading emails, higher than those who use it for making calls. (https://www.impactbnd.com/blog/mobile-marketing-statistics). Two other major services that will continue to grow on smartphones will be payments and messaging. By 2020, smartphones able to perform payment services will exceed 5 billion, and messaging apps will see audiences exceed 5 billion as well. (https://www.cnbc.com/2017/01/17/6-billion-smartphones-will-be-in-circulation-in-2020-ihs-report.html). From 2017 to 2020, it is estimated that the installed global base of smartphones will grow by 50% to 6.1 billion smartphone users (generating $355 billion in revenue), which is 70% of the world's population, and smartphones will account for 80% of all mobile data traffic. (http://techcrunch.com/2015/

06/02/6-1b-smarphone-users-globalluy-by-2020-overtaking-basic-fixed-phone-subscriptions/; https://www.cnbc.com/2017/01/17/6-billion-smartphones-will-be-in-circulation-in-2020-ihs-report.html). It is also estimated that emerging markets will account for 80% of new subscriptions by 2020, which will come primarily from Asia Pacific, the Middle East, and Africa. (https://techcrunch.com/2015/06/02/6-1b-smartphone-users-globally-by-2020-overtaking-basdic-fixed-phone-subscriptions/). It is additionally estimated that there will be a 59% penetration rate by 2022 with highest portions in Central & Latin America, then Asia Pacific, then Africa & the Middle East. (https://www.strategyanalytics.com/strategy-analytics/blogs/smart-phones/2016/12/21/44-of-world-population-will-own-smartphones-in-2017#.WiMjYLQ-fxr).

Although smartphones and the cases that are used to protect them are available from numerous manufacturers, across all these devices in the various ways that they are used, there exists a uniform problem common to everyone's use of them. The problem remains that people need to hold the phone in their hand, keep it steady while reading and interacting with the screen, and secure it from dropping and breaking. Although several patents have been granted and products have emerged to help users in this regard, these devices offer potential solutions that are suboptimal, as they are either permanent or semi-permanent attachments to the mobile device or its case and often include modifications to the smartphone case. Despite these aids that attempt to help users better hold and operate their smartphones, roughly 33% of people lose or break their smartphone (https://www.scripted.com/writing-samples/how-often-do-cell-phone-users-accidentally-break-theirdevices), with the average iPhone being broken in the first 10 weeks of ownership. (http://www.techadvisor.co.uk/feature/mobile-phone/average-iphone-broken-in-just-10-weeks-3460583/). In fact, it is reported that the top 2 ways an iPhone breaks include being dropped on a hard surface (43%) and falling into water (toilet, sink, bath, etc.) (35%) (https://www.techadvisor.co.uk/feature/mobile-phone/average-iphone-broken-in-just-10-weeks-3460583/). In 2017, 79% of smartphone users used a case. (https://www.statista.com/statistics/368627/us-protective-case-usage-among-smartphone-owners/). Notwithstanding the fact that the overwhelming majority of smartphone owners use a case, one study shows damaged iPhones cost Americans $10.7 billion since their introduction in 2007, $4.8 billion alone in 2012-2013, and all smartphones, including iPhones, cost Americans a total of $23.5 billion in repairs & replacements from 2007-2014. (https://www.squaretrade.com/press/new-study-shows-damaged-iphones-cost-americans-10.7billion-4.8b-in-the-last-two-years-alone). In addition, 60 million smartphones are lost, stolen, or damaged annually. (https://www.marketwatch.com/story/what-it-really-costs-when-you-lose-your-smarphone-2012-04-09). Furthermore, data recovery from damaged smartphones can cost anywhere from a few hundred dollars to more than $1,500 for professional services. (http://www.nbcnews.com/id/31908845/ns/technology and science-wireless/t/smartphone-whoops-painful-expensive/#.WinStLQ-fxo). Discussed herein is a substantial amount of data on the number of accidents with smartphones and the billions of dollars of cost incurred as a result of these accidents, and the object of the present disclosure has the potential to substantially reduce these negative consequences for potentially billions of people.

In addition to those smartphone aids mentioned above, there are several items in the prior art that require a smartphone case to be specially made to accommodate the holding apparatus, which restricts the user to only use that case, if they want that type of holding apparatus. Since smartphones frequently become items of personal expression, with phones and cases in different colors and designs, like jewelry, this type of case prevents the user from using other commercially available smartphone cases and, therefore, restricts their personal expression and preference. Other holding devices in the prior art include a strap permanently affixed to a rigid frame that is capable of being adhesively attached to the smartphone or its case. These semi-permanent attachments are claimed to be removable and re-adjustable, but would be inconvenient to do so on a frequent basis, and repeated removal and reinstallation would likely weaken the adhesive's ability to adequately secure the attachment to the smartphone/case, potentially causing accidents and costly breakage. In addition, other holding apparatuses are available that include handles, wrist straps, elastic materials with hooks that cover or overlap the edges of the phone, bulky plastic telescoping posts and tethered disks or loose loops, but all of them tend to be uncomfortable, cumbersome, inconvenient, aesthetically unattractive, and/or often get in the way of using the phone or inserting and removing it from a person's pocket or bag.

It is now becoming apparent that smartphone use can cause hand pain, especially in the thumb (https://www.today.com/health/smartphone-use-can-lead-hand-pain-t231611, since thumbs drive 75% of all phone interactions, according to a study (https://alistapart.com/article/how-we-hold-our-gadgets). As much as we use them, the fact remains that our use of smartphones is unstable, since many people (49%) use one hand (67% use their right hand) (https://alistapart.com/article/how-we-hold-our-gadgets) and mostly in the portrait mode. (https://www.uxmatters.com/mt/archives/2013/02/how-do-users-really-hold-moble-devices.php).

Further, these numerous smartphones are not effectively being exploited for personal expression, messaging, brand promotion, and advertising. Moreover, should one use an elastic material printed with a logo in an effort to express a personal design, advertise or promote a brand or other message on the exterior of the smartphone or the smartphone's case, expanding the elastic material would distort the logo rendering it less visible or indecipherable to a consumer, making the design, advertising, branding, and/or messaging ineffective.

Accordingly, there is a need for a device that remedies the disadvantages described above and allows users to better hold and operate their smartphones more effectively and comfortably while reducing drops, breakage, and excessive strain on the hand.

SUMMARY

Smartphones have become so ubiquitous that people use them in conjunction with many of their other activities throughout the day and evening, including exercising and other fitness related activities, traveling, reading and multi-tasking, etc. and they require a convenient tool to help them hold and use their phones more effectively and comfortably for longer periods of time. In addition, such a means should also assist the user in holding their phone more securely and in a way that compliments and assists them with what they are doing and not interfere with it.

A flexible, stretchable, and adjustable strap that is designed to be used with most commercially available smartphone cases to assist the user in holding and using their smartphone is provided. These straps are easily interchangeable and can be installed on and removed from such cases in minutes, without adhesive, modifications to the case, or any structure permanently attaching the strap to the case, thereby allowing the user to quickly and easily change straps and put a new strap on their current case or use their current strap on a different case, without the need to purchase a new case. The strap, consisting of a stretchy/elastic material with hook and loop fasteners (e.g. Velcro), on each end that enable connection to form a loop through the existing ports on the case, is positioned to lie flat against the back of the case and may be stretched from this resting position to accommodate the user's hand, or other objects, to steadily hold the cased smartphone. An additional key feature of this strap is the ability to quickly and easily adjust the tension over time to improve the user's grip on their smartphone, providing the ability to continue to customize the fit over their long-term use and ownership of their smartphone.

The elastic strap easily installs into the open ports of the phone case and is held tightly in place by the tension created by stretching the elastic and fixing such tension in position with the hook and loop fasteners, as well as the pressure exerted by the phone once it is inserted into the case. Since most smartphones fit securely into their respective cases, this pressure fit helps to secure any movement of the strap around the case. This allows the case to hold the strap securely and allows the strap to stretch when the user inserts their hand between it and the case. Various hand-holding positions are permitted by this long flexible strap, which, with some phones, runs almost the entire length of the back of the case. Users can use their whole hand or any number of fingers in any configuration, as they find which positions are most comfortable for them. While involved in various activities, for convenience they can also temporarily hang their phone via the strap from any available post, coat hook, or other support. In addition, ample room is available to print logos on one or both sides of the strap, which logos remain visibly identifiable/recognizable and only minimally or not at all deform upon being stretched during use, providing a new venue for personal expression by users and brand promotion by companies and organizations.

Further, there remains a need for a process that can apply the logo onto an elastomeric support strap of the device by infusing colored dyes into the interior of the fibers of the elastomeric support strap allowing for advertising when using the device on a smartphone case. Accordingly, a process that can apply the logo onto an elastomeric support strap of the device by infusing colored dyes into the interior of the fibers of the elastomeric support strap allowing for clearer and more durable expression, branding, advertising, and/or messaging when using the device on a smartphone case is provided. The elastic strap can include a logo applied by systems and methods as described in U.S. Patent Application Publication No. 2014/0127477, filed Nov. 8, 2013, which is incorporated herein in its entirety. Using these systems and method, a dye or other substance(s) can be infiltrated into a material, such as an elastic strap body, which can be a heterogeneous solid that comprises at least two solid phases, for example a synthetic polymer fiber. Dye or other substances that a user desires to infiltrate into the heterogeneous solid are introduced to the solid to be infiltrated. Energy (for example heat and/or electromagnetic energy) is applied at or around a characterized Boson peak region of the heterogeneous solid, resulting in an increase in the permeability of an interface region between the two solid phases (e.g., amorphous and crystalline) to the dye or other substance. In some embodiments this energy is applied at reduced (i.e. less than 1 atmosphere) pressure. The increase in permeability is due to the temporary formation of tunnels or similar structures within the interface region due to the amount of energy applied. The infiltrating material is driven into the permeabilized interface region by diffusion, capillary forces, ripplons, or a combination of these or similar forces. Following uptake of the dye or other material the energy applied to the heterogeneous solid is changed, resulting in a reduction of the permeability of the interface region, trapping the dye or other material within the heterogeneous solid and can result in dispersion of the dye or other material within the heterogeneous solid.

One group of embodiments are methods for infiltrating a substance into a heterogeneous solid, for example a synthetic polymer or a fiber of a material of the elastic strap. The heterogeneous solid includes a first phase, a second phase, and an interface region that is interposed or lies between the first and second phases. In some embodiments the first region includes an amorphous solid and the second region includes a semi-crystalline or crystalline solid. A permeating substance, for example a dye or other colorant or other material, is brought into contact with the heterogeneous solid and an energy is applied. Energy may be applied before or after the substance or other material is brought into contact with the heterogeneous solid. The applied energy causes the interface region to become permeable in a temporary or reversible fashion, for example by the formation of tunnels. This is accomplished by applying an energy that preferably lies within a Boson peak region of the material of the heterogeneous solid. Such energy can be in the form of heat, electromagnetic radiation (for example infrared radiation), or a combination of these. In some embodiments the energy is applied in at least a partial vacuum to advantageously reduce the temperature required to cause permeability of the interface region thereby allowing for lower temperatures and expanding the range of heterogeneous materials that could be used with the methods described herein. A driving force is applied that infiltrates the permeating substance into the interface region. Suitable driving forces include capillary action and/or the formation of ripplons. The applied energy is then modified to reduce the permeability of the interface region or, alternatively, render it impermeable.

Another group of embodiments are composite solids made by infiltrating a permeating substance, for example a dye or other colorant, into a heterogeneous solid, for example a synthetic polymer or fiber of a material of the elastic strap. The heterogeneous solid has multiple solid phases, including a first region, a second region, and an interface region between the first and second regions. The permeating substance is introduced into the interface region of the heterogeneous solid by application of an energy that renders the interface region temporarily or reversibly permeable, for example by applying an energy that is at a Boson peak region of the heterogeneous solid. In some embodiments the first region is an amorphous solid and the second region is semi-crystalline or crystalline solid. In a preferred embodiment the composite solid is resistant to chemical bleaching.

The elastic strap can include a logo applied by systems and methods as described in U.S. Patent Application Publication No. 2016/0102430, filed Oct. 14, 2015, which is incorporated herein in its entirety. Such systems, methods, and related devices can dispense microdroplets of dye onto individual filaments or fibers and infuse them into the interior of such filaments and/or fibers in a highly controlled manner. Control of dye dispensing permits changing the dye applied to a fiber during a dyeing operation and supports the generation of patterns in woven products via the dyeing process.

A system is disclosed for producing a colored filament that includes (i) the source of a filament, which can include a polymer, (ii) a colorant application unit that receives the filament, (iii) a print head, which is in fluid communication with a dye or colorant, (iv) a colorant infusion unit that receives a coated filament from the colorant application unit, (v) a source of infrared radiation, (vi) connection to one or more vacuum sources, which reduces the pressure within the colorant application unit to less than ambient air pressure, and (vii) a drive unit that moves the filament through the colorant application unit and the colorant infusion unit. In some embodiments the print head is in fluid communication with a second dye or colorant, and the print head can be instructed to dispense a first colorant and a second colorant over different time intervals. Suitable colorants or dyes include disperse dyes or reactive dyes. In some embodiments the polymer of the filament includes a crystalline phase, and amorphous phase, and an intermediate phase interposed between the crystalline phase and the amorphous phase. The source of infrared radiation emits a wavelength of infrared radiation at an energy that corresponds to a boson peak in the infrared energy absorbance profile of the polymer. The primary colorant can be a disperse dye. After dyeing, the fiber can be collected on a take up reel or it can be supplied directly to a fabrication unit (such as a knitting machine, loom, or other unit to form elastics, fabrics, webbings, ribbons, etc.). In some embodiments a preheating module is placed between the colorant application unit and the colorant infusion unit.

A system is also disclosed in which two or more systems as described above can be arranged to work in parallel, such that two or more filaments or fibers are dyed simultaneously. In such embodiments the colorant infusion units can be connected to one or more common vacuum sources (for example, using a manifold). In such embodiments two or more of the dyed filaments or fibers produced can be supplied to a single reel or to a single fabrication device (for example, a knitting machine, loom, or other unit to form elastics, fabric, webbings, ribbons, etc.).

A method is also disclosed of providing a colored filament where a filament is moved through a colorant application unit and a colorant infusion unit. A primary colorant is dispensed onto a first portion of the filament as it moves through a colorant application unit by a print head to generate a first segment of a coated filament. This is transferred to the colorant infusion unit where a first infrared irradiation is applied to the coated filament at a pressure below that of ambient air pressure. This disperses the primary colorant within the coated filament to generate a first segment of a colored filament. In some embodiments, a secondary colorant is dispensed onto a second segment of the filament as it moves through the colorant application unit by the same print head to generate a second segment of the coated filament, and a second infrared irradiation is applied to the coated filament at a pressure below that of ambient air pressure as it moves through the colorant infusion unit. This disperses the secondary colorant within the coated filament to generate a second segment of the colored filament. In preferred embodiments, the gap between the first segment of colored filament and the second segment of colored filament is equal to or less than 2 cm. Suitable dyes include disperse dyes and reactive dyes, and in some embodiments the primary colorant is a disperse dye and the secondary colorant is a reactive dye. Following infusion of the colorant, the filament can be transferred to either a take up reel or a fabricator.

In addition to printing on a filament that is then incorporated into a final product, such as a fabric, mesh, ribbon, webbing, or elastic, it should be further appreciated that the system described above can be configured to print directly onto any such final product, such as a fabric, mesh, ribbon, webbing, elastic, or other suitable material such as printing a logo onto a flat elastic webbing, such as onto an elastic strap body.

The above-described and other advantages and features of the present disclosure will be appreciated and understood by those skilled in the art from the following detailed description, drawings, and appended claims.

BRIEF DESCRIPTION OF THE DRAWINGS

FIG. 18 schematically depicts movement of the applied material into the interior of the heterogeneous solid via the permeabilized regions.

DETAILED DESCRIPTION OF THE PREFERRED EMBODIMENT

Figure 1:
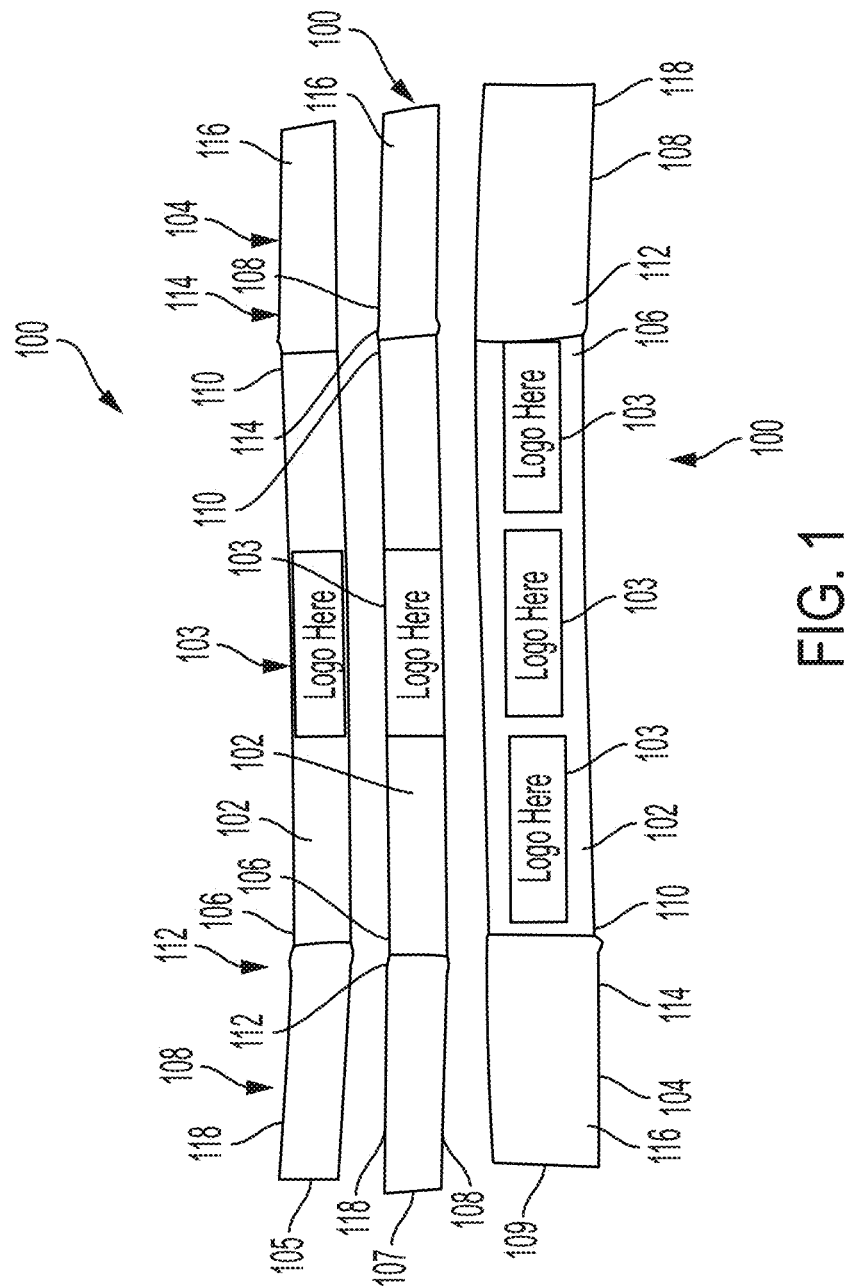
FIG. 1 is a front view of three elastomeric straps of the present disclosure.
Figure 4:
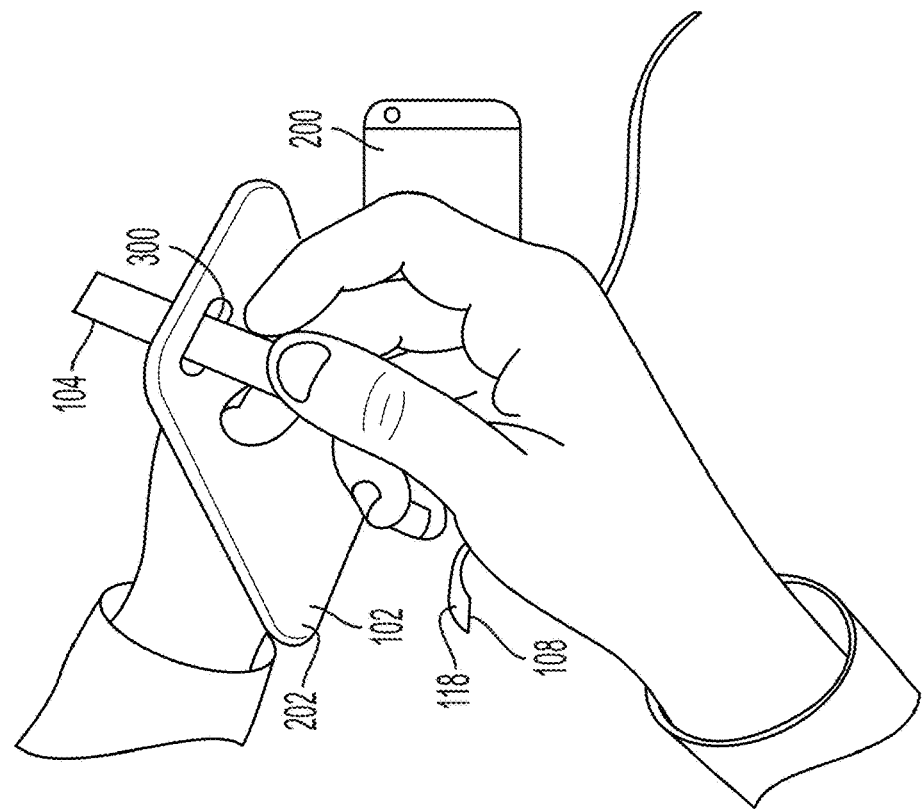
FIG. 4 is a rear perspective view of the case of FIG. 2 disconnected from the mobile phone and having a first end of the first elastomeric strap of FIG. 3 through a camera port in the case.

Referring to FIG. 1, three elastomeric straps 100, designated as first elastomeric strap 105, second elastomeric strap 107 and third elastomeric strap 109, of the present disclosure are shown. Elastomeric straps 100 each have a strap body 102. Strap body 102 has one or more logos 103. Logos 103 are printed on strap body 102 to minimize or eliminate deformation of logos 103 upon stretch of strap body 102. Strap body 102 has a first end 110 and a second end 106. Strap body 102 is connected to a first fastener 104 at first end 110 and a second fastener 108 at second end 106. Strap body 102 is connected to first fastener 104 and second fastener 108 by stitching 114 and 112, respectively, but could also be connected by other methods known in the art, such as glues, adhesives, staples, thermal bonding, heat sealing, etc. First fastener 104 mates with second fastener 108 by hook and loop fasteners (e.g. Velcro®) to form a loop. In addition to standard hook and loop fasteners, such as Velcro®, other adjustable fastening methods are also possible, such as the 3M Dual Lock™ reclosable fastener (preferably Low Profile), resealable adhesives, matching interlocking ridges, etc., all of which shall be encompassed herein by reference to the term "hook and loop" fastener or closure system. First fastener 104 has a first portion of the hook and loop fastener that faces a first direction on a first surface 116. Second fastener 108 has a second portion of the hook and loop fastener that faces a second direction, opposite the first direction, on a second surface 118, as shown in FIG. 4. Elastomeric straps 100 are support straps for a user's hand that fasten to the case of a mobile device, e.g., a smartphone case, (i) to reduce the tendency to drop the phone, (ii) to enable more comfortable use and effective control of the phone, (iii) to reduce hand and/or finger fatigue while using the phone, (iv) are logoed to promote the user's favorite design, brand, organization, cause or expression, which logos remain visibly identifiable/recognizable during use, (v) have a flush profile for easier phone use and storage, (vi) are made with flexible elastic material, (vii) are easily interchangeable to promote personal expression, and (viii) are an inexpensive solution to an expensive and inconvenient problem of dropping the phone. By 2020, nearly 80% of smartphone users could benefit (4.8 billion people) by use of elastomeric straps 100.

Figure 2:
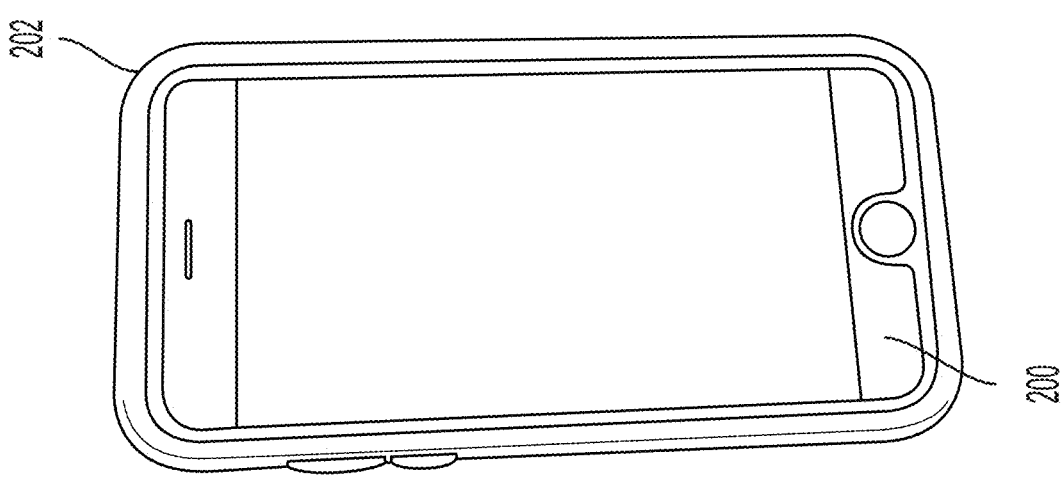
FIG. 2 is a front view of a mobile phone connected to a case that can be used with the elastomeric straps of FIG. 1.

Referring to FIG. 2, elastomeric straps 100 can be used with a mobile device 200, such as a phone, shown as a smartphone, and, in particular, an iPhone® 6 smartphone, and case 202, shown as an Otterbox®. To connect elastomeric strap 100 to mobile device 200, mobile device 200 is disconnected from case 202.

Figure 3:
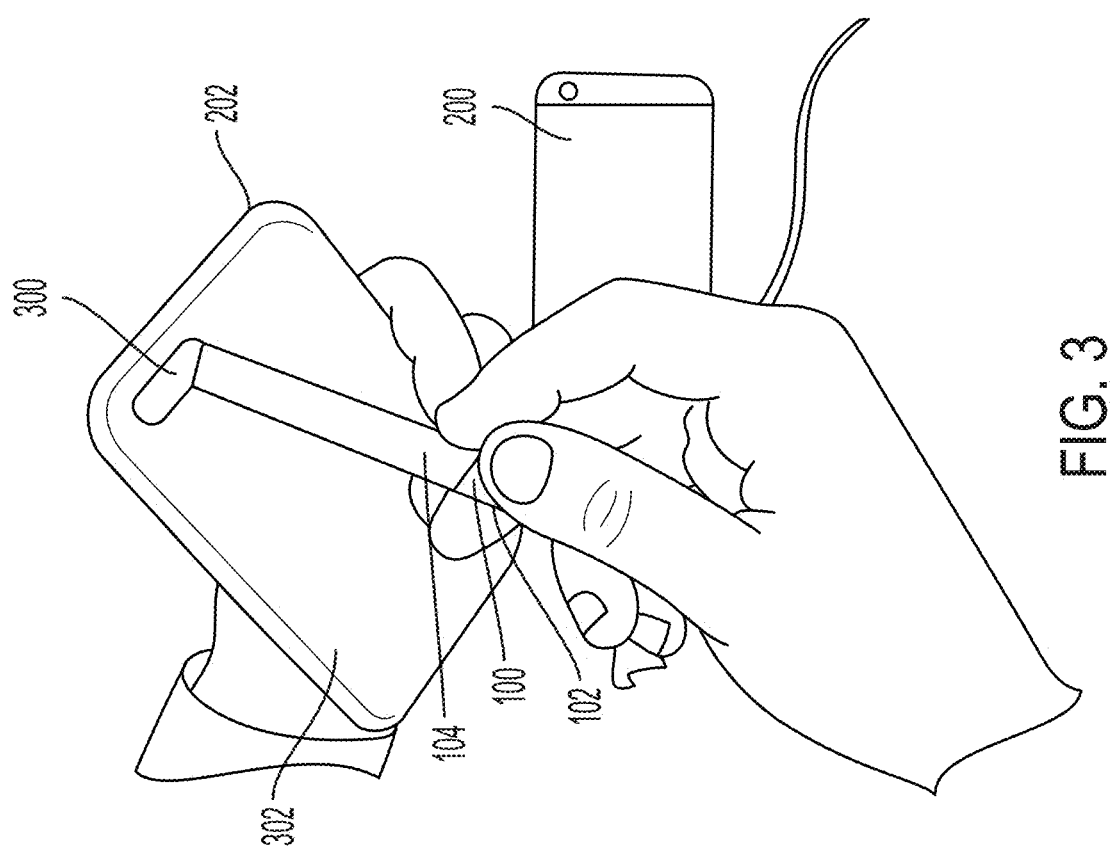
FIG. 3 is a rear perspective view of the case of FIG. 2 disconnected from the mobile phone and disconnected from a first elastomeric strap of the elastomeric straps of FIG. 1.
Figure 5:
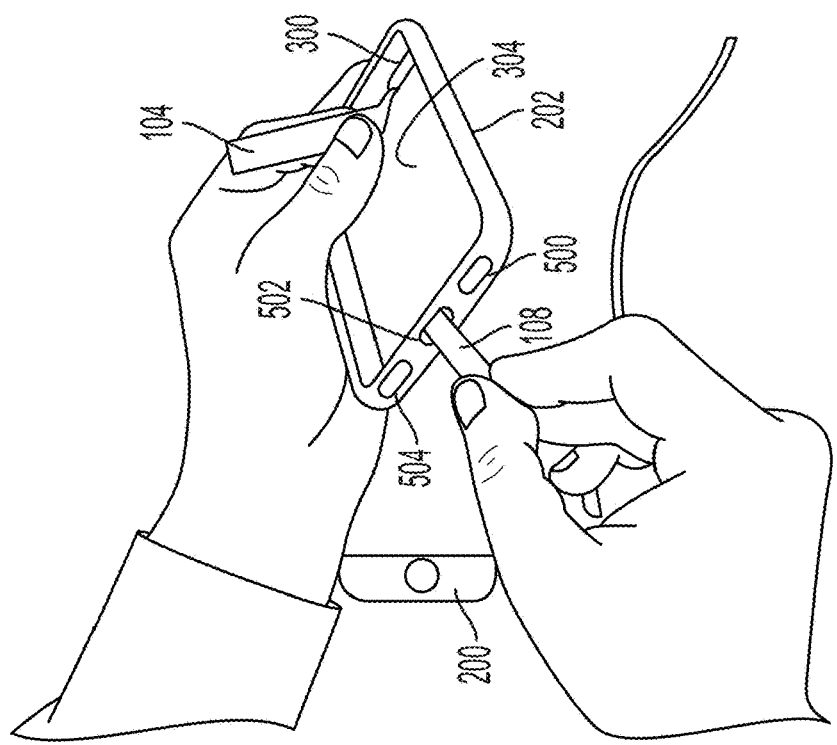
FIG. 5 is a front perspective view of the case of FIG. 2 disconnected from the mobile phone and having a second end of the first elastomeric strap of FIG. 3 through a power port in the case.

Referring to FIG. 3, once mobile device 200 is disconnected from case 202, a camera port 300 in case 202 is exposed. Camera port 300 extends from an outer surface 302 to an inner surface 304, as shown in FIG. 5 that contacts mobile device 200 when case 202 is connected to mobile device 200. Camera port 300 is present in case 202 to allow a camera lens of mobile device 200 to be exposed so that mobile device 200 can take pictures while connected to case 202.

Referring to FIG. 4, first fastener 104 of first elastomeric strap 105 is passed through camera port 300 in a direction from outer surface 302 to inner surface 304 so that a portion of strap body 102 is maintained through camera port 300.

Referring to FIG. 5, case 202 has a speaker port 500, a power port 502 and a headset/microphone port 504. A portion of strap body 102 is maintained through camera port 300 while second fastener 108 is passed through power port 502 from outer surface 302 to inner surface 304 so that a portion of strap body 102 is maintained through power port 502 and another portion of strap body 102 on outer surface 302 of case 202 contacts outer surface 302. Although second fastener 108 is shown as passed through power port 502, alternatively, second fastener 108 could instead be passed through speaker port 500 or headset/microphone port 504.

Figure 7:
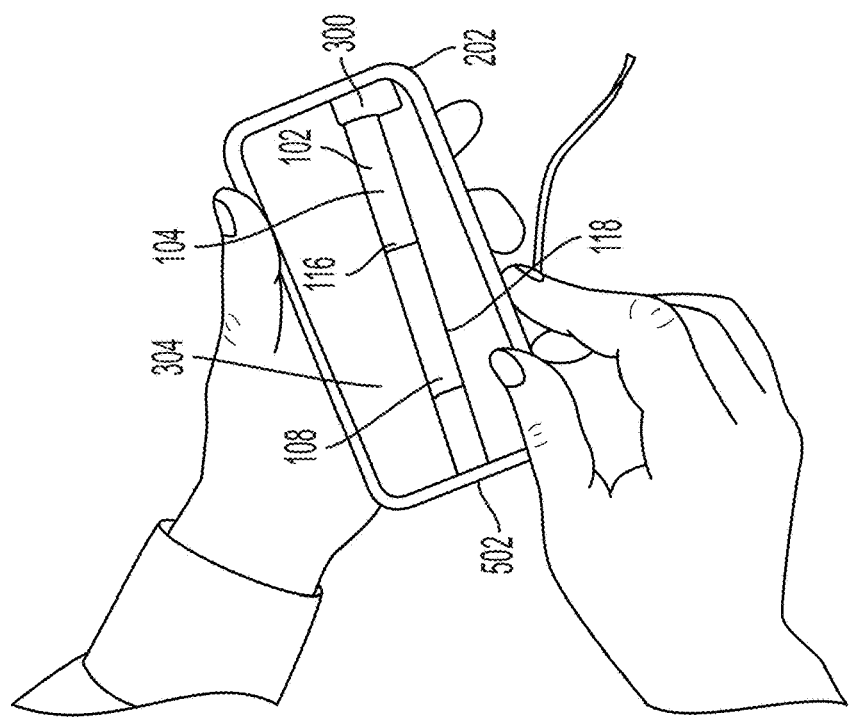
FIG. 7 is a front perspective view of the case of FIG. 2 disconnected from the mobile phone and having the first end of the first elastomeric strap of FIG. 3 through the camera port in the case connected to the second end of the elastomeric strap of FIG. 3 through a power port in the case so that the case and the first elastomeric strap are connected.
Figure 6:
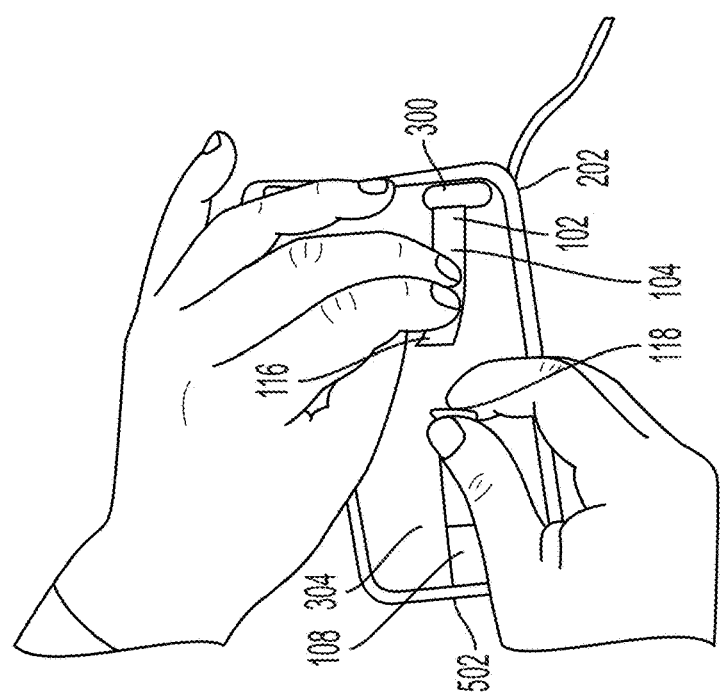
FIG. 6 is a front perspective view of the case of FIG. 2 disconnected from the mobile phone and having the first end of the first elastomeric strap of FIG. 3 through the camera port near the top of the case and the second end of the first elastomeric strap of FIG. 3 through a power port at the bottom of the case.

Referring to FIGS. 6 and 7, a portion of strap body 102 is maintained through camera port 300 and a portion of strap body 102 is maintained through power port 502 while first surface 116 of first fastener 104 contacts second surface 118 of second fastener 108 to connect first fastener 104 and second fastener 108 by the hook and loop fasteners to form a loop.

Figure 8:
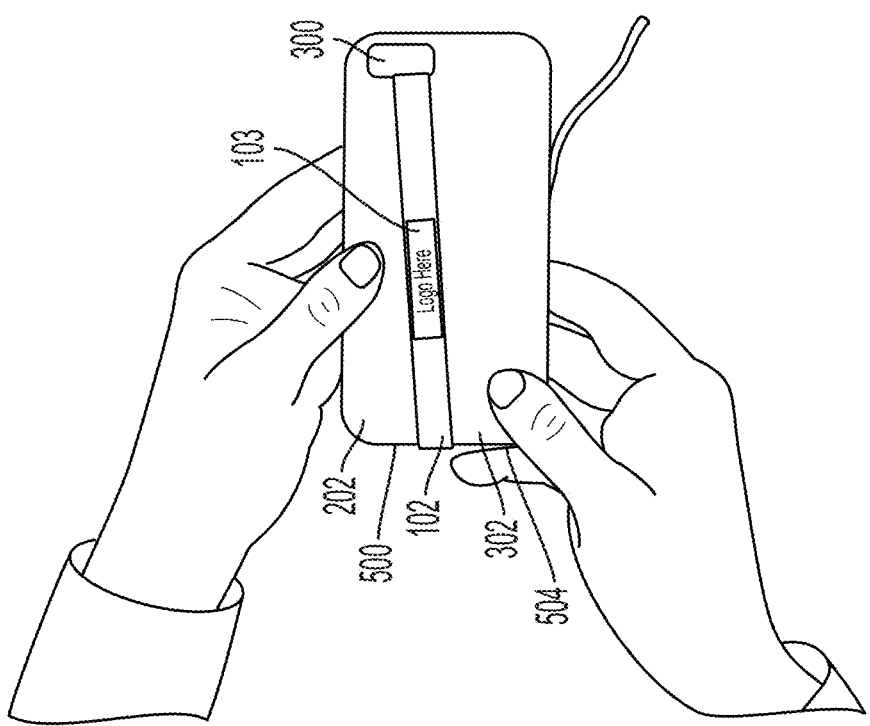
FIG. 8 is a rear perspective view of the case of FIG. 2 disconnected from the mobile phone and connected to the first elastomeric strap.

Referring to FIG. 8, while first fastener 104 and second fastener 108 are connected, the portion of strap body 102 on outer surface 302 of case 202 contacts outer surface 302. Alternatively, if second fastener 108 could instead be passed through speaker port 500 or headset/microphone port 504, the portion of strap body 102 on outer surface 302 of case 202 would be on a greater angle relative to camera port 300, making it very customizable and suitable for use by either the left or right hand.

Figure 9:
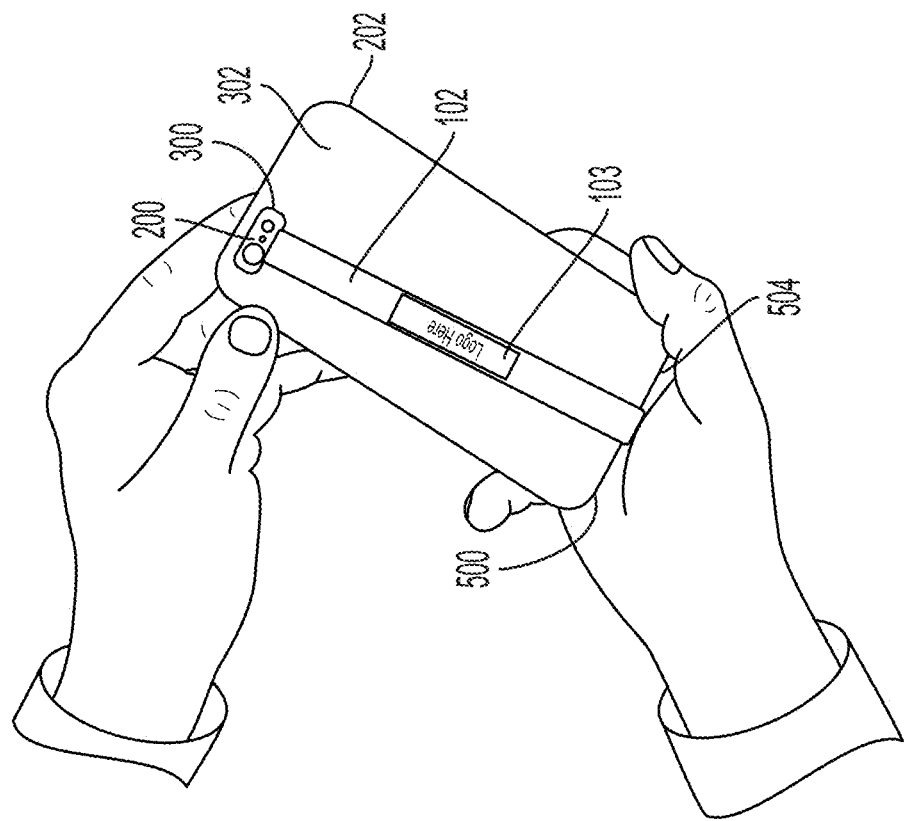
FIG. 9 is a rear perspective view of the case of FIG. 2 connected to the mobile phone and connected to the first elastomeric strap.

Referring to FIG. 9, while first fastener 104 and second fastener 108 are connected, mobile device 200 can be inserted into case 202 to connect mobile device 200 to case 202.

Figure 10:
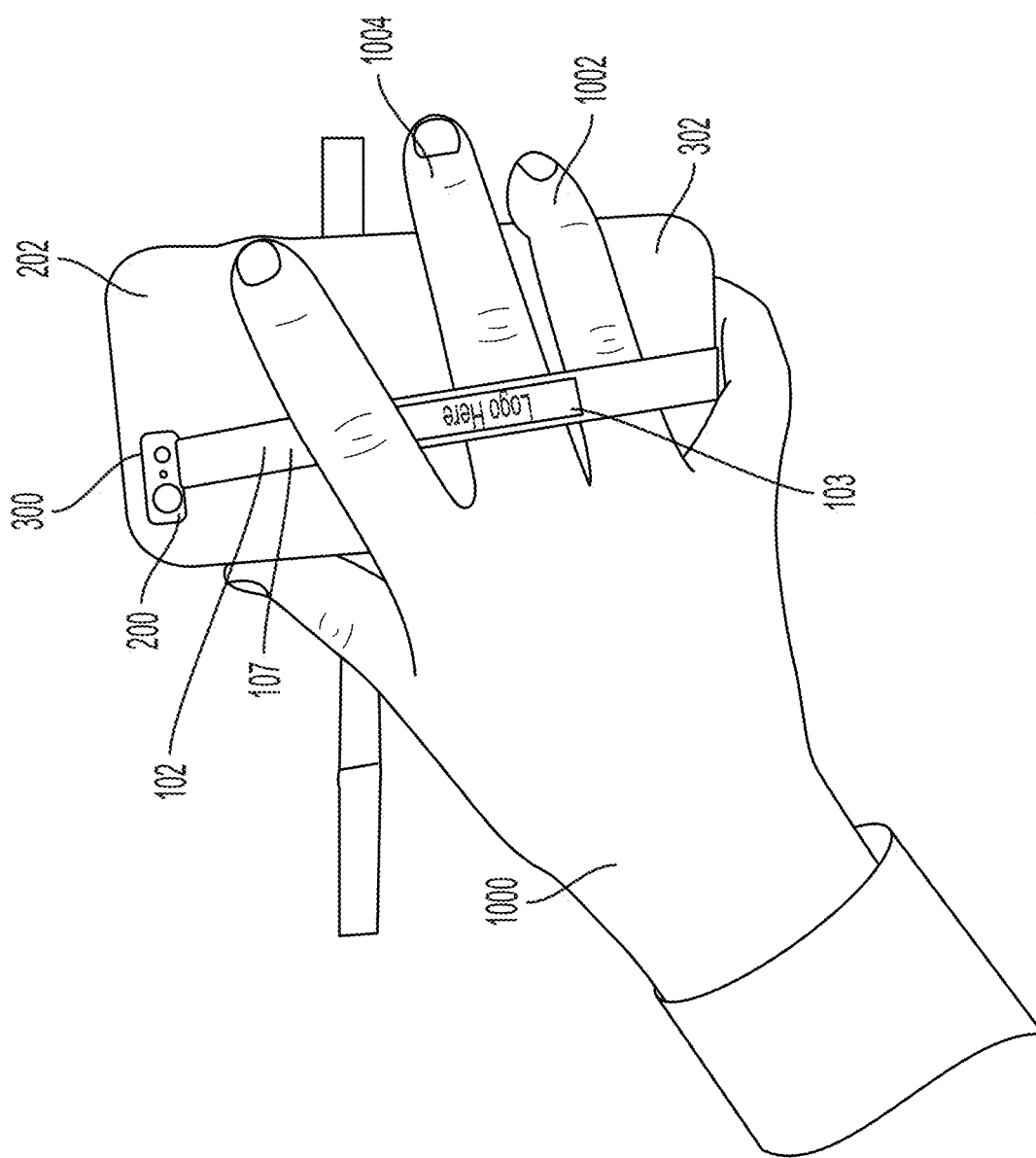
FIG. 10 is a rear perspective view of the case of FIG. 2 connected to the mobile phone and connected to a second elastomeric strap of the elastic straps of FIG. 1 having two fingers between the case and the second elastomeric strap.

Referring to FIG. 10, elastomeric strap 107 of FIG. 1 is shown. A first user 1000 can place two fingers 1002 and 1004 between outer surface 302 of case 202 and strap body 102 of elastomeric strap 107 to hold mobile device 200 and case 202 simultaneously. Although the material of elastomeric strap body 102 stretches upon placement of two fingers 1002 and 1004 between outer surface 302 and strap body 102, logo 103 remains visibly identifiable/recognizable during use and is minimally or not at all deformed upon stretch of strap body 102.

Figure 11:
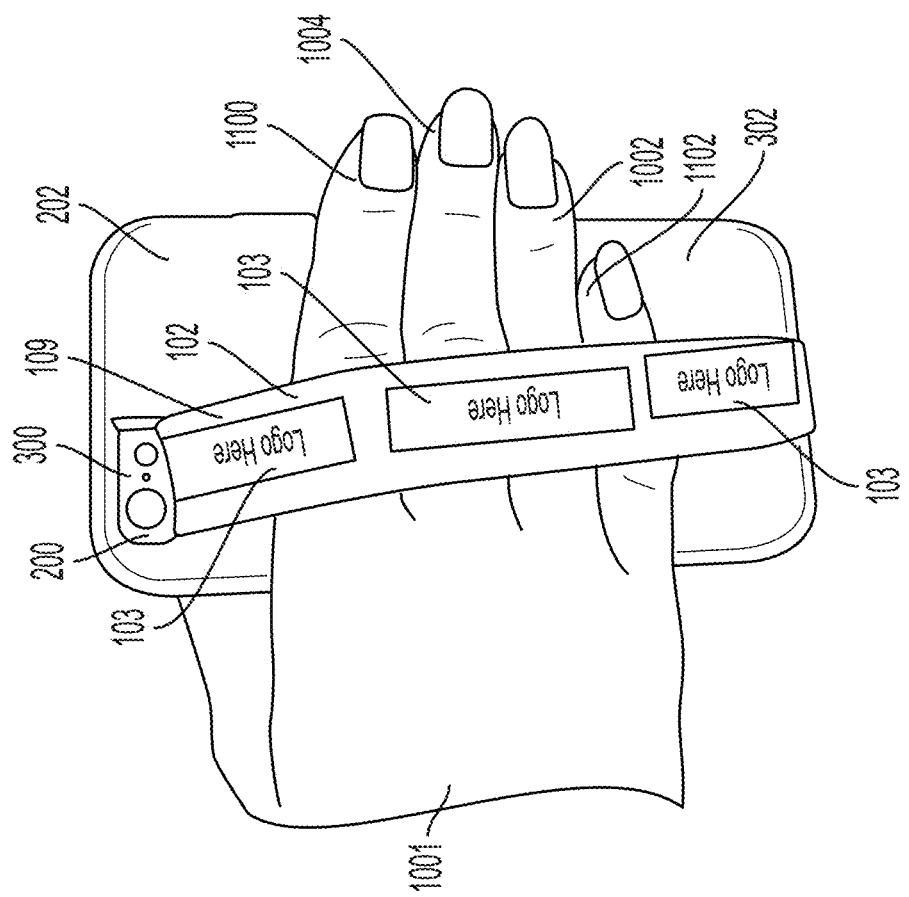
FIG. 11 is a rear perspective view of the case of FIG. 2 connected to the mobile phone and connected to a third elastomeric strap having four fingers between the case and the third elastomeric strap.

Referring to FIG. 11, elastomeric strap 109 of FIG. 1 is shown. A second user 1001 can place four fingers 1002, 1004, 1100, and 1102 between outer surface 302 of case 202 and strap body 102 of elastomeric strap 109 to hold mobile device 200 and case 202 simultaneously. Although the material of elastic strap body 102 stretches upon placement of four fingers 1002, 1004, 1100, and 1102 between outer surface 302 and strap body 102, logo 103 remains recognizably visible during use and is minimally or not at all deformed upon stretch of strap body 102.

Figure 12:
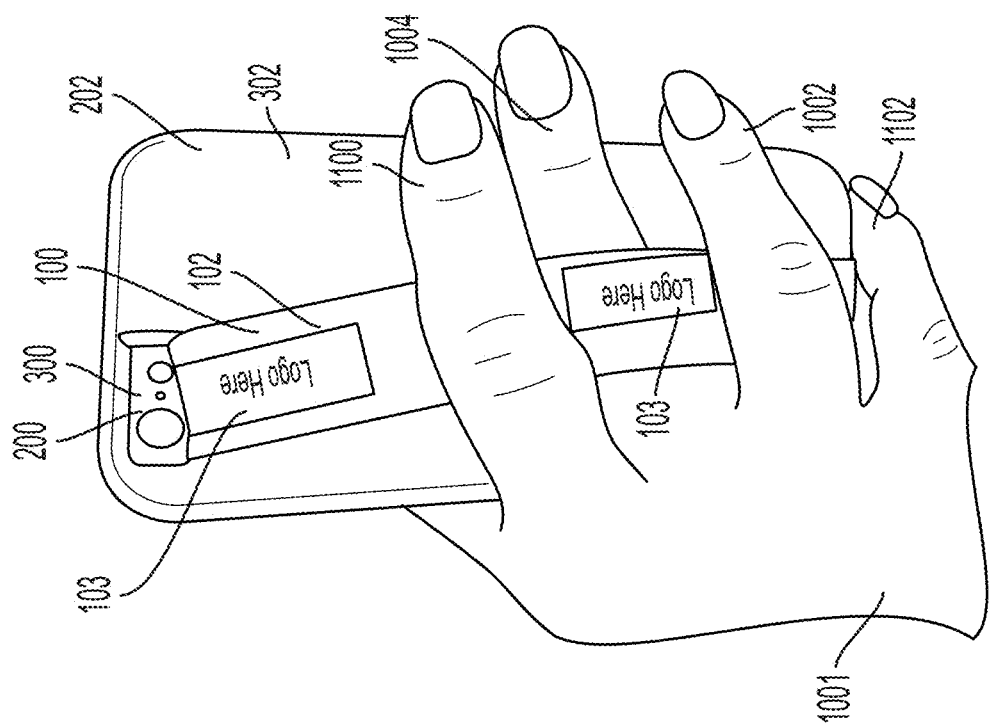
FIG. 12 is a rear perspective view of the case of FIG. 2 connected to the mobile phone and connected to the third elastomeric strap having one finger between the case and the third elastomeric strap.

Referring to FIG. 12, second user 1001 can place one finger 1004 between outer surface 302 of case 202 and strap body 102 of elastomeric strap 109 to hold mobile device 200 and case 202 simultaneously. Although the material of elastic strap body 102 stretches upon placement of one finger 1004 between outer surface 302 and strap body 102, logo 103 remains recognizably visible and is minimally or not at all deformed upon stretch of strap body 102.

Accordingly, elastomeric strap 100 can fit many different hand and finger sizes. In addition, elastomeric strap 100 can fit most cases, not just the case shown as case 202.

The use and function of elastomeric strap 100 relies primarily on an elastomeric fabric material of strap body 102. For example, the fabric of strap body 102 is a woven elastomeric fabric. Elastic fabrics, also called flexible straps, webbings, tapes, etc., can be made in nearly an infinite number of varieties. The woven elastomeric fabric requires a flexible elastic material that stretches in the lengthwise or longitudinal direction, i.e., the "warp", but with minimal to no stretch in the latitudinal or transverse direction, i.e., the "weft" or "woof". These fabrics are made with an elastic material that is often comprised of spandex, rubber, or other materials that have elastomeric properties. In many cases, this elastic filament, as a core material, can be wrapped with a non-elastic material such as polyester or nylon to provide strength, durability and protection to the core elastic strand. This wrapping can be done in many ways to produce (i) single-covered elastic yarns, where a single strand of non-elastic polyester or nylon is wrapped in a single direction around the elastic spandex or rubber core, (ii) double-covered elastic yarns, where the non-elastic outer strands are wrapped in opposite directions around the elastic core, and (iii) air-covered elastic yarns through a high-speed process that entangles the elastic and non-elastic materials together to produce the elastic yarn.

In many cases, these yarns are composed of multiple layers of filaments grouped or twisted together for strength and durability and can be produced in any number of combinations, with as few as two or three filaments up to 50 filaments or more for apparel applications. A common combination for an elastic strand is often found to be 34, 36, 44, 48, and 68 (microfiber) filaments. For narrow elastic webbings, it is common to have these strands contain 34 or 36 filaments. The size of these strands or yarn is measured in "denier" with higher numbers representing increasing thicknesses. It is also common to texture the yarn to increase its volume and to instill other desired properties, such as air and vapor permeability, smoothness and a more compliant feel.

To produce an elastic fabric, the elastic material is then knit or woven in combination with other elastic and non-elastic materials such as polyester, nylon, cotton, Kevlar, rubber (natural latex), polyisoprene, Neoprene, spandex, silicone, acrylic, olefin, acetate, rayon, orlon, latex and/or other materials. The elastic yarns can be positioned in a lengthwise or longitudinal direction (warp), or in a latitudinal or transverse direction (weft or woof) with other elastic or non-elastic materials positioned in the opposite direction. These elastic fabrics can be made in a diverse combination of constituent materials and in a wide variety of styles for different applications.

Selection of the right elastic material for strap body 102 is important, as certain materials will work better with elastomeric strap 100 than others. Since the subject of elastomeric strap 100 will be used by people holding elastomeric strap 100 in and around their hands and washed from time to time, spandex is a better choice in contrast to natural rubber, as rubber does not last as long, especially when it comes into frequent contact with perspiration and chlorine, and some people are allergic to it. To gain additional desirable properties, such as water resistance, antimicrobial/antibacterial protection, etc., other treatments and materials could also be considered to improve the strap's performance and preserve its integrity and durability.

For purposes of strap body 102, many types of elastic and non-elastic materials could be used to produce a suitable fabric. However, the optimal fabric would be a smooth, flat, thin, comfortable, woven material with elastic properties in the lengthwise or longitudinal direction (warp) and with non-elastic properties in the latitudinal or transverse direction (weft or woof). A sample of one such optimal fabric was custom produced by Interstate Narrow Fabrics, Inc., with offices at 1101 Porter Avenue, Haw River, N.C. 27258. This material was a woven narrow elastic with a 560 denier spandex woven in the warp direction to supply stretch longitudinally, and a non-elastic 150 denier textured polyester for the filling woven in the weft or woof direction to supply strength and support without stretch laterally. A ½" sample of this material consisted of 44 ends of 560 denier spandex that was double-covered with two single ends of non-elastic 150 denier textured polyester 36 filaments wrapped in opposite directions with one end on the top and one end on the bottom of the spandex. This elastic yarn was produced by McMichael Mills, Inc., with offices at 130 Shakey Road, Mayodan, N.C. 27027. This material was heat treated to generate a fuller, softer, and more comfortable feel with a desirable luster and was pre-shrunk to retain its shape and improve its suitability for printing. In the present case, dye-sublimation printing was used, although other methods known in the art could be used as well. Synthetic filament yarns work well for sublimation printing, which is important for the present disclosure, since the clarity of the printed logos, as defined earlier, to be applied to them is critical to the commercial success of the product.

To manufacture the woven elastic webbing, Interstate Narrow Fabrics, Inc. loom weaved this 560 denier spandex material, in combination with the non-elastic 150 denier textured polyester produced by Unifi, Inc., with offices at 7201 W. Friendly Ave., Greensboro, N.C. 27410. Although the finished elastic webbing can be woven in a wide variety of widths, this material in a ½" width±¹⁄₁₆" was found to be an optimal width for the present disclosure. Other widths for this elastic material up to approximately 1" could also work well. Although the specific percentages of fiber content used to produce elastic fabric can vary greatly from approximately 1%-99% for each fiber used, the sample mentioned above contained 62% spandex and 38% polyester. Likewise, although elastic fabrics can be produced with a wide range of stretch, depending upon the type and percentage of spandex, rubber, or other elastomeric materials used, the above sample had an elasticity/expansion capacity of 70%±10%. For example, a 10 inch piece of this fabric at rest could expand to a stretch limit of an additional 6 inches to 8 inches for a total stretched length of approximately 16 inches to 18 inches. In addition, strap body 102 can have a thickness of between 0.004 inches and 0.125 inches.

Although the above materials work well as strap body 102, there are other suitable materials known to those skilled in the art, and the above description of the optimal material, including the constituent components in their disclosed percentages, at the elasticity/expansion capacity and dimensions described above should not be construed as a limitation on the suitability of other materials or to narrow the scope of this disclosure to just the material disclosed above. All suitable narrow elastic materials that work in the application of the disclosure are considered to be encompassed within the present disclosure.

The ability to print on the above elastic fabrics is an important feature of elastomeric strap 100. Commercial success will depend upon the capability of these fabrics to clearly, accurately and durably receive and retain the desired logos, as described above, across various for-profit and not-for-profit industries and sectors of society.

Although printing is a well-established and highly diverse technology involving the use of paints, dies, stains, and other elements to reproduce desired content, printing on flexible, elastic materials is more challenging as certain materials such as paints, which primarily remain on top of the material, will crack with use over time and distort the printed image, especially when stretched. In the case of the present disclosure, dye-sublimation printing was found to be the optimal method for printing on narrow elastic webbing. Dye-sublimation printing works by penetrating the surface of certain materials with special inks, which then bond with certain polymers in that material, when heated, to create a permanent image. While dye-sublimation printing can be done on a wide variety of rigid and soft substrates, when it comes to fabrics, only polyesters, nylons and other synthetic materials are suitable. Sublimation inks are printed onto a specially treated sublimation transfer paper, which is then heat pressed against the fabric to transfer the inks into and permanently bond with the fabric upon cooling. This process allows the base fabrics to retain their shape and feel, while supporting printed images that will not wear or wash off. Dye-sublimation printing on narrow elastics can be especially challenging and the sample mentioned above was printed by Trans-Tex, Inc., with offices at 117 Pettaconsett Avenue, Cranston, R.I. 02920. The above description is not intended to limit the present disclosure, and all other similar printing processes on suitable narrow elastic fabrics are included within the present disclosure as well.

Another method to apply logo 103 onto strap body 102 is to use the systems and methods of infusing colored dyes into the interior of the fibers of strap body 102, for example, by a process called Active Tunnel Coloration Infusion Technology, or Active Tunnel Infusion, for short, available from a company known as AM4U, Inc., which stands for "apparel made for you". This process can be used for demand manufacturing or purchase activated manufacturing. In other words, instead of producing garments or other finished fabrics in advance, a manufacturer would produce the garment after the customer orders it and then produce it quickly to the customer's specifications. This process seems to allow rapid production of these custom designed garments, and is designed as an entire system to support this business model. This process has the ability to completely infuse the fibers of strap body 102 with various color dies capable of creating logo 103. This process can be of a form of digital printing which uses physics rather than chemistry to permanently infuse solid or patterned color into a synthetic fabric with a system that bombards the fabric with photons, causing the amorphous and crystalline zones to separate, so that the dye is taken into the fiber via capillary action. The fabric is permanently sealed, and the color will not wash or even bleach out. The technology not only saves time, but eliminates the use of water and resulting effluents.

One method has a dye or other substances that are infiltrated into a heterogeneous solid that is a mixture of at least two solid phases, for example a synthetic polymer fiber, which can be included in the material of strap body 102. These apparatus, systems, and methods use an application of energy that lies within or near a Boson peak of the material of the heterogeneous solid to temporarily and/or reversibly permeabilize the material, permitting infiltration and subsequent dispersal of dyes, colorants, and/or other substances within the body of the heterogeneous solid.

These systems, methods, and processes use a combination of energy emission and transmission environments to multiply the energy efficiency and control needed to produce permanent repeatable infiltration of coloration or other substances into fabrics and other materials. Penetration or infiltration of substances into heterogeneous solids that include an amorphous component can be realized by energizing the solid (for example, via heat and/or infrared/near infrared irradiation) to where the solid approaches or reaches a Boson peak characteristic of an amorphous phase of the solid. Altering conditions and/or energy inputs to move away from the Boson peak conditions reverses changes in the permeability of the solid and entraps the infiltrating substance within the solid. For example, the transition of the solid back to a non-permeable state advantageously allows for dyes to be trapped deeper within the solid than with prior art dyeing methods, and thereby helps the solid maintain the dyed color despite exposure to ultraviolet radiation or bleach, as just two possible advantages. Altering the environment within which the energy is applied (i.e. the transmission environment), for example by reducing the ambient air pressure, permits phase transitions characteristic of the process to occur at reduced temperatures.

Figure 14:
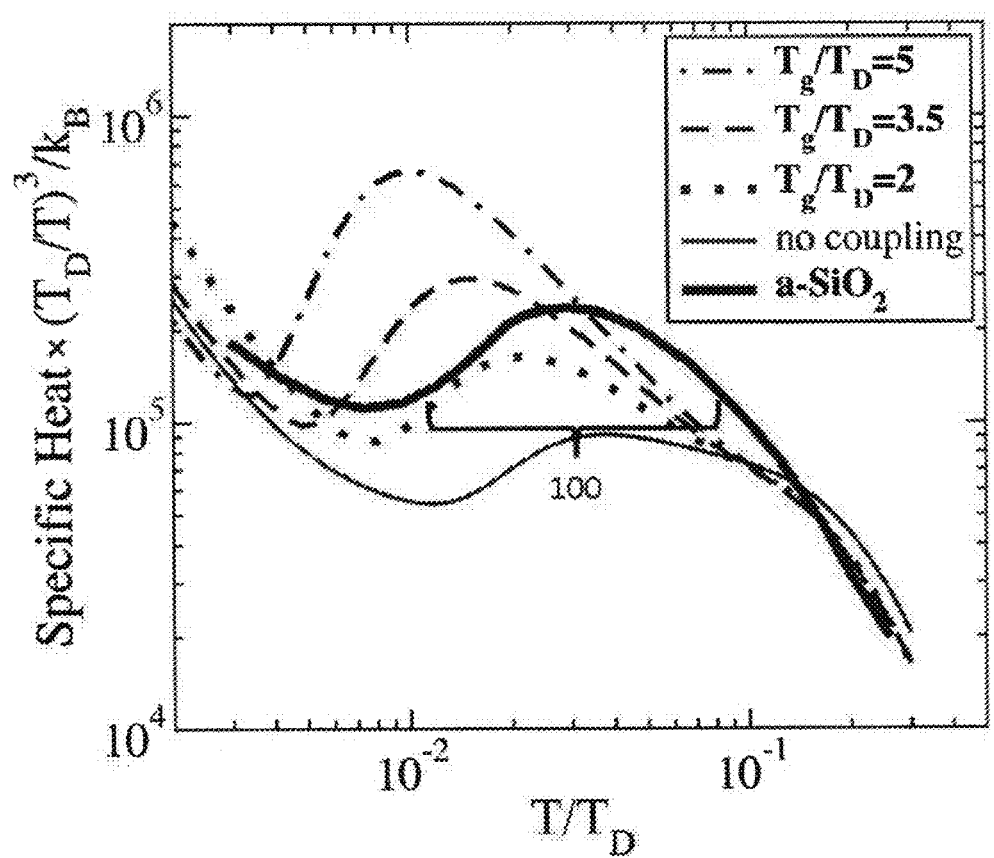
FIG. 14 shows a nonlinear increase in specific heat as temperature is raised in an amorphous solid, demonstrating a Boson peak region characteristic of such materials.

This phenomena may be related to the behavior of materials as described by Lunkenheimer and Loidl (J. Non-Cryst. Solids (2006) 352:4556-4559) and Lubchenko and Wolynes (Proc. Nat. Acad. Sci. (2002) 100(4):1515-1518), who postulated that the Boson peak may be related to local changes within the material, which may result from the mosaic structure of glasses and other amorphous solids that results from their method of preparation. A Boson peak can be readily observed in suitable materials, such as amorphous polymers, by techniques that characterize parameters dependent on the number of degrees of freedom available to atoms or molecules within the material. Typical techniques include microcalorimetric determination of heat capacity, neutron scattering, and electromagnetic radiation scattering. A typical Boson peak for amorphous silica 100 is shown in FIG. 14, taken from Lubchenko and Loidl, which shows changes in heat capacity as a function of temperature (shown as a ratio to the Debye temperature for silica). The resulting nonequilibrium may manifest as stored energy in the form of stress at the boundaries between amorphous and crystalline clusters within the structure of a polymer or other heterogeneous solid, and can act as a source of mechanical action that provides space and capillary action to load a dye, colorant, or other desired substance into heterogeneous solid, such as a synthetic fiber.

The conversion of the intrinsic energy stored during formation of the heterogeneous solid into mechanical excitation, which forms tunnels and the accompanying capillary action (for example via a capillary tension wave, i.e. a ripplon) reaches its maximum efficiency at an energy return level at or near a Boson peak (e.g., within a Boson peak region) of the heterogeneous solid. By maintaining a receiving heterogeneous solid (for example a fiber) at an energy level corresponding to a Boson peak region of the solid after melting a donor or permeating substance on the surface of the heterogeneous solid, the permeating substance can be pumped into the heterogeneous solid without the use of a solvent carrier or activating chemicals. Such a process can be used for the introduction of dyes or other colorants to fibers and fabrics while removing the requirement for any use of water and toxic chemicals.

The equipment that produces the finished product can use electromagnetic energy and/or thermal energy sources. In some embodiments a high-energy placement stage uses banks of near infrared emitters (for example, filtered incandescent lights, light emitting diodes, or lasers) tuned to a resonance of the permeating substance (for example, a dye) and the heterogeneous solid (for example, a fiber). Such resonances can be readily identified using known techniques, such as IR and near IR spectroscopy. This allows rapid high volume placement of the permeating substance onto the heterogeneous solid. Placement techniques can be adapted to the nature of the permeating substance and the heterogeneous solid, and can include deposition of a solution or suspension of the permeating substance (for example via spraying, immersion, or printing), a phase change to convert the permeating substance (for example, a dye) to vapor which, then, condenses to liquid on the surface of the heterogeneous solid (for example, a fabric), or deposition of a dry permeating substance onto the surface of the heterogeneous solid (for example, by electrostatic attraction). It should be appreciated that the permeating substance can be applied to all or only a portion of the heterogeneous solid. Similarly, it should be appreciated that energy that permits the permeating substance to enter the heterogeneous solid can be applied to all or only a portion of the heterogeneous solid.

Once the permeating substance has been transferred to the surface of the heterogeneous solid (for example, a fabric), and is brought to a calculated energy level a physical phenomenon occurs magnifying the kinetic movement of the amorphous portion of the fibers' structure. Since all polymers both natural and manmade contain both crystalline and amorphous molecular structures, the movement creates temporary regions of increased permeability, such as tunnels at the boundaries or interfaces between amorphous and crystalline or semi-crystalline regions. Such tunnels can support the formation of ripplons (capillary action surface waves) within the boundary or interface regions. Such ripplons can convey the permeating substance from the surface of the heterogeneous solid, for example, the introduction of dyes into synthetic fibers, which can provide color penetration and leveling throughout the fiber. The amount and degree of penetration of a permeating substance can be controlled by adjusting emitter intensity, chamber air pressure, emission time, and/or the size of the permeating species. When the output of the energy source is reduced or eliminated the tunnels collapse, leaving the permeating material trapped below the surface of the heterogeneous solid. This advantageously protects the permeating substance from environmental factors. For example, dye introduced into a synthetic fiber or fabric in this fashion is impervious to bleach and other cleaning agents.

The three defining steps of the infusion of a permeating substance into a heterogeneous solid using such active tunnel processes are placement, penetration and leveling.

The following is a detailed description of each step for an exemplary process in which a dye or other colorant is introduced into a synthetic fiber of the material of elastic strap body 102 to apply logo 103 onto elastic strap body 102.

Placement:

A typical colorant used in this process is an inert dispersed dye, however, the process is not limited to such colorants. Rather the process could use other liquids or solids for example, including pharmaceuticals and so forth. The placement of dye, for example, that will form logo 103 on the surface of the receiving heterogeneous solid, hereafter called the receiver, for example, elastic strap body 102, can be accomplished by a number of different methods. One of these is physical placement, for example printing directly on the surface of the receiver. Another method is to print the image, pattern, or color on a donor paper and place it in contact with the receiver. A thermal or heating step changes the printed dye into a vapor, which diffuses to the surface of the receiver and condenses into an image, pattern, or color on the surface of the receiver. This process has been used historically as a final coloring solution. Another method of placement that can be used when the desired end product is a solid color is to place the receiver in a microcoating device and roll or spread a dye solution evenly on the surface of the receiver, then store it for later use. Still another method is to attract the dye to the surface of the receiver using electrostatic interactions. This method is particularly advantageous in reduced pressure environments. It should be appreciated, however, that any method that brings the dye (or any desired permeating substance) into contact with the surface of the heterogeneous solid receiver can be suitable. Once the dye is in position on the surface of the receiver, the receiver is ready for the next process step.

Penetration:

Once the dye has been placed on the surface of the receiver the condensed liquid is conveyed into gaps or tunnels formed at the boundary or interface region between crystalline and amorphous phase zones in the receiving material. Tunnels are formed in the receiver by the application of controlled energy at or around a Boson peak of the receiving material (e.g., with a Boson peak region). It is believed that this is accomplished by exciting the enthalpies of formation (energy stored during formation) of the polymer or other heterogeneous material using thermal energy and/or harmonically tuned photons (light waves). It is believed that the observed increase in degrees of freedom within the amorphous phase of the receiver within the Boson peak region is derived, at least in part, from orbital movement of amorphous phase zone molecular clusters, which in turn induce the formation of gaps or tunnels that permeabilize the interface region between the stationary crystalline cluster and the excited orbiting amorphous clusters. These gaps or tunnels extend deep into the interior of the receiving heterogeneous solid. The surface of the tunnel walls can exhibit capillary forces, for example, a wave of capillary surface action (i.e. ripplons) away from the energy source, which conveys the dye or other permeating substance deep into the heterogeneous solid.

Leveling:

The energy applied to the receiving heterogeneous solid is maintained at a level at or around a Boson Peak of the receiver (e.g., within a Boson peak region) until all excess dye has been drained from the surface and deposited into the body of the receiver. While this provides efficient delivery of the permeating substance into the interior of the heterogeneous solid, the permeating substance can still be largely confined to the gaps or tunnels induced in the permeabilized interface regions. In order to produce a more evenly infiltrated composite product it is desirable to redistribute the dye or other permeating material within the heterogeneous solid. This can be accomplished by slowly reducing the applied energy, causing the boundary crevices to close on the dye clusters. This vice-like collapse of the tunnels creates mechanical stress on the dye clusters, causing them to decompose to smaller parcels and further disperse and saturate the receiver, thus leveling the distribution of the dye and the appearance of the color. On further reduction or termination of the input energy, the tunnels fully collapse, which leaves the dye permanently trapped inside the receiving polymer.

Figure 15:
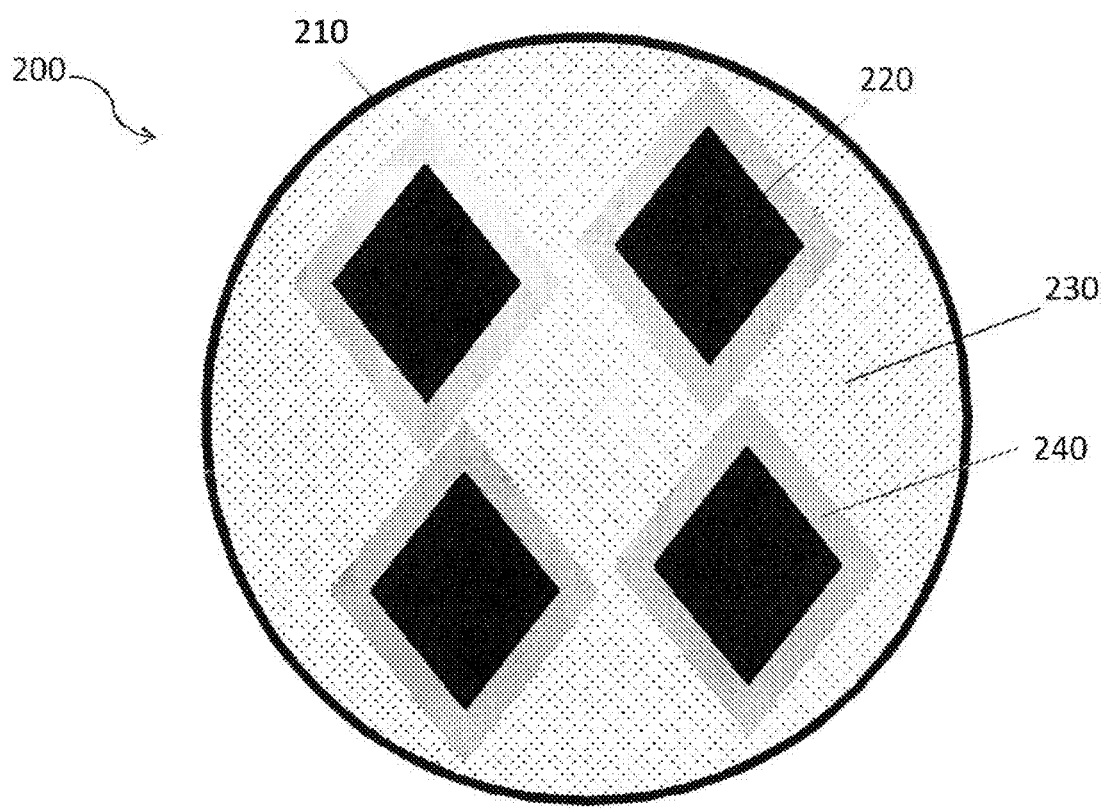
FIG. 15 schematically depicts a heterogeneous solid, having an amorphous phase, a semi-crystalline or crystalline phase, and an interface region where the two phases meet.

FIG. 15 through FIG. 20 illustrate the steps of one process. FIG. 15 shows a heterogeneous solid 200 with a surface 210. In some embodiments the heterogeneous solid is made of a single material that is arranged in different fashions throughout the solid, for example a solid made of a polymer that has solidified in different molecular configurations. In other embodiments the heterogeneous solid can include different materials or types of materials. The heterogeneous solid can be a naturally occurring or synthetic fiber, which can be treated as an individual fiber, as part of a yarn, as part of a felt or woven fabric, or as part of a finished textile good (or a portion thereof), for example, the material of elastic strap body 102. The heterogeneous solid 200 includes two or more solid phases, for example a crystalline or semi-crystalline phase 220 and an amorphous phase 230. The different phases can have different permeabilities. An interface region 240 occurs where the different phases interact.

Figure 16:
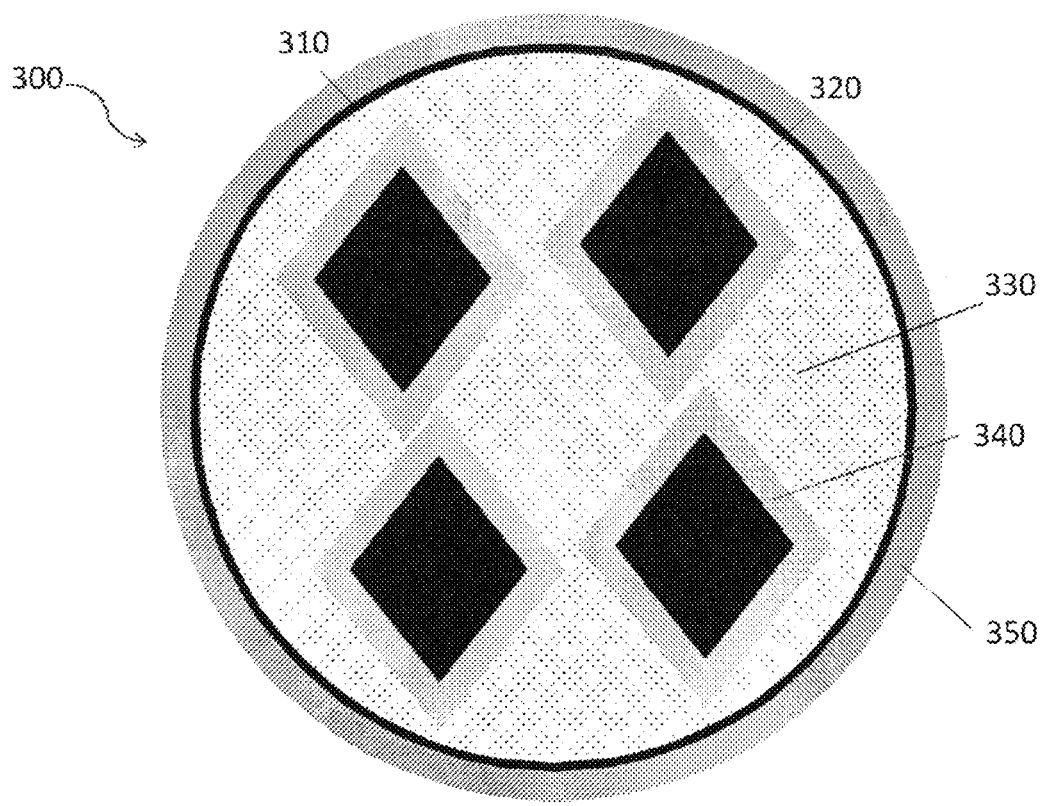
FIG. 16 schematically depicts an initial phase of the infiltration process, where a material to be incorporated into the heterogeneous solid is placed in contact with the surface of the heterogeneous solid.

FIG. 16 shows the heterogeneous solid 300 that has been contacted with a permeating substance 350 that a user wishes to infiltrate into the heterogeneous solid. As depicted here, the permeating substance 350 is applied to the surface 310 of the heterogeneous solid, and at this point in the process does not contact the crystalline or semi-crystalline phase 320, the amorphous phase 330 or the interface region 340, except where such phases or regions form part of the surface 310. The permeating substance 350 can be applied to the surface 310 by any suitable means, for example direct application (ex: as a solution, suspension, paste, or powder), transfer (ex: heat transfer from a transfer sheet), electrostatic attraction between oppositely charged permeating substance and heterogeneous solid, or any means that provides physical contact between the permeating substance 350 and the surface 310 of the heterogeneous solid without resulting in significant damage or loss of desired activity or characteristics. Although depicted as covering the heterogeneous solid 300, it should be appreciated that the permeating substance 350, for example, that will form logo 103, can be applied to only a portion of the heterogeneous solid 300.

The nature of the permeating substance 350 depends on the intended properties with which the user intends to endow the final composite material. Examples of permeating substances include dyes or other colorants (such as fabric dyes and pigments), pharmaceutically active substances (such as steroid hormones, estrogens, androgens, acetylcholinesterase inhibitors, stimulants, antidepressants, insulin or insulin analogs, vitamins, nicotine, scopolamine, and/or analogs thereof, antiseptics, antibiotics, anticoagulants, tissue growth and/or trophic factors, etc., and any combinations thereof), polymers with advantageous properties (such as polymers with high wear resistance, high chemical resistance, high tensile strength, a high refractive index, a low refractive index, and/or polymers capable of reflecting or absorbing non-visible wavelengths of electromagnetic energy), and/or metals or suspensions of metallic particles. The permeating substance 350 can be a dye or other colorant suitable for use in textiles and, specifically suitable to produce a logo 103 on strap body 102.

Figure 17:
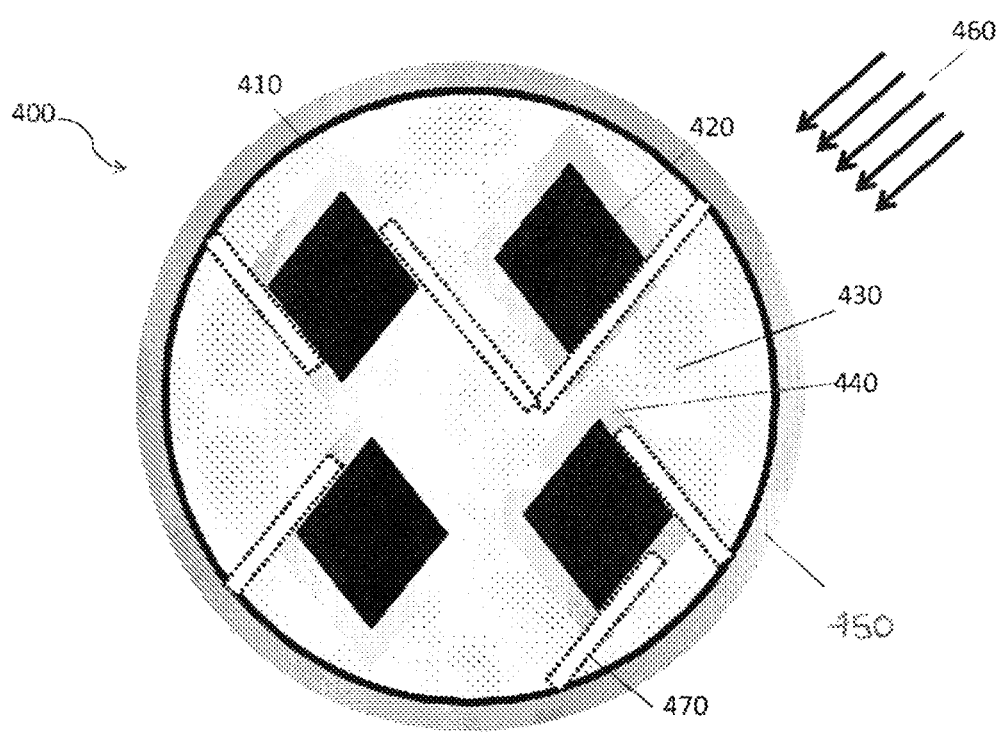
FIG. 17 schematically depicts the application of energy to the heterogeneous solid, resulting in increased permeability as shown by the formation of tunnels.
Figure 16:
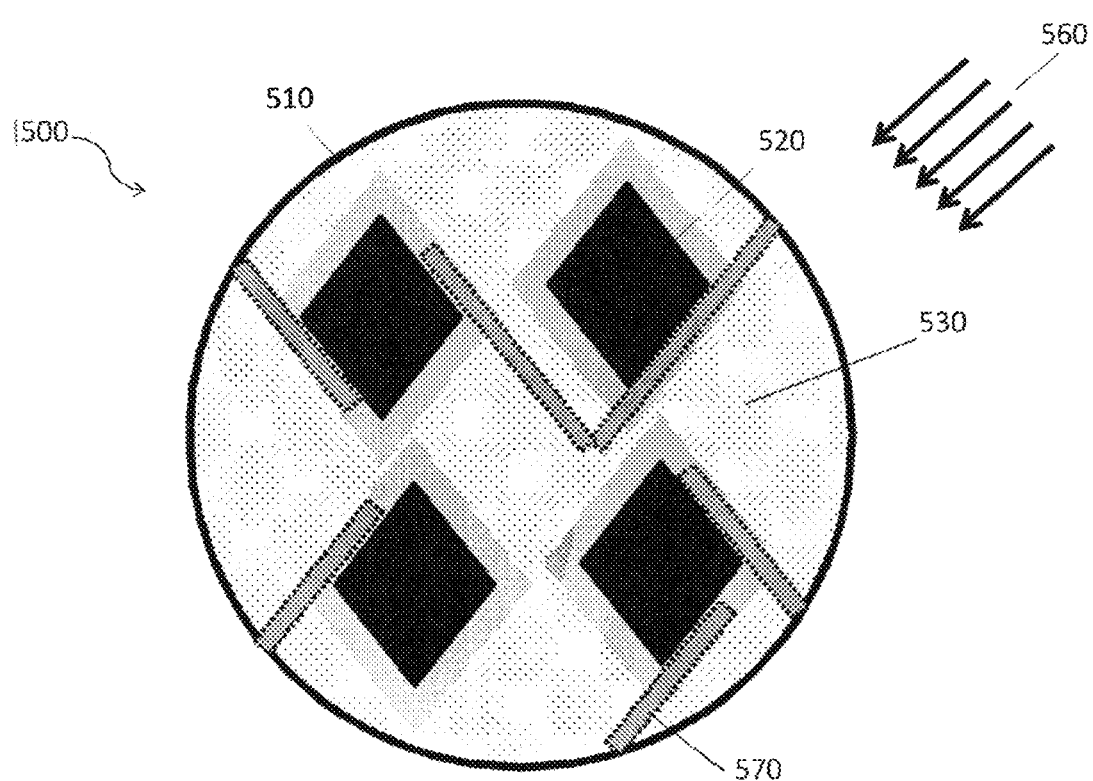

FIG. 17 depicts the formation of permeable regions within the coated heterogeneous solid 400. Energy 460 is applied to the coated heterogeneous solid 400 to cause the formation of permeable regions (for example, tunnels) 470 within the interface region 440 between the crystalline or semi-crystalline phase 420 and amorphous phase 430 regions of the heterogeneous solid. At least some of these permeable regions 470 extend to the surface 410 of the heterogeneous solid and can permit passage of the permeating substance 450. Applying an energy that lies within a Boson peak region of the material of heterogeneous substance greatly facilitates the formation of the permeable regions or tunnels within the heterogeneous solid. It is believed that the use of such energy supports a large number of degrees of freedom within the amorphous phase 430 of the heterogeneous solid, thereby changing its fluidity and releasing tensions that develop during the formation of the heterogeneous solid. Without wishing to be bound by theory, it is believed that this tension is relieved by the formation of tunnels 470 or cracks within the interface regions 440 between the now more fluidic amorphous phase 430 and the relatively rigid crystalline or semi-crystalline phase.

The energy 460 applied to the heterogeneous solid 400 can be in any form suitable to apply the energy needed to drive the process in a controlled manner. Examples of suitable energies include heat (such as conductive heat and/or convective heat), electromagnetic radiation (for example, microwave, infrared, near infrared, visible, near ultraviolet, and/or ultraviolet radiation), electromagnetic induction, and/or chemical reaction. The energy can be applied as heat, infrared or near infrared radiation, or a combination of these.

Reducing atmospheric pressure (such as through the use of a vacuum or a partial vacuum) during energy application reduces the amount of energy required by the process. This advantageously reduces operating costs in terms of energy and equipment, and additionally can permit the use of a combination of materials that would be incompatible at ambient or elevated pressures. For example, selection of a suitable reduced pressure in combination with a suitable energy can permit the use of a permeating substance (for example a dye or other colorant) with a melting point that is markedly different from that of the heterogeneous solid (for example a synthetic fiber). Such reduced pressures or at least partial vacuums can be applied by reducing ambient pressure within an enclosed space housing equipment used in the process or can be applied by reducing pressure within equipment used in the process (for example, in partially or transiently open equipment that permits continuous processing).

As shown in FIG. 18, application of the energy 560 results in an infiltrated heterogeneous solid 1500. As in the depicted embodiment, the permeating substance can enter the permeabilized regions or tunnels 570 as the energy 560 is applied. In some embodiments the permeating substance can be found primarily within the permeabilized regions or tunnels 570, being essentially entirely withdrawn from the surface 510 and not found in significant amounts within the bulk of the amorphous 530 and crystalline or semi-crystalline 520 regions of the heterogeneous solid 1500. Advantageously, the amount of permeating substance applied can be selected to be completely or nearly completely taken up by the heterogeneous solid 1500, reducing or eliminating the need for post-treatment washing to remove unincorporated permeating substance. The permeating substance can be a dye or other colorant that is completely or nearly completely taken up by a synthetic fiber, thereby dramatically reducing the time required and the energy and water consumed by a dyeing or coloring process. Another advantage is realized in such embodiments in restricting the permeating substance to the interior of the final composite material, in that such placement provides protection from environmental factors (such as moisture, heat, chemicals, bacteria, fungi, and so on) that may degrade the permeating substance. Localization of dyes or other colorants to the interior of a synthetic fiber provides protection from chemical oxidants (such as bleach), permitting disinfection during laundering of fabrics treated by such a process.

Figure 19:
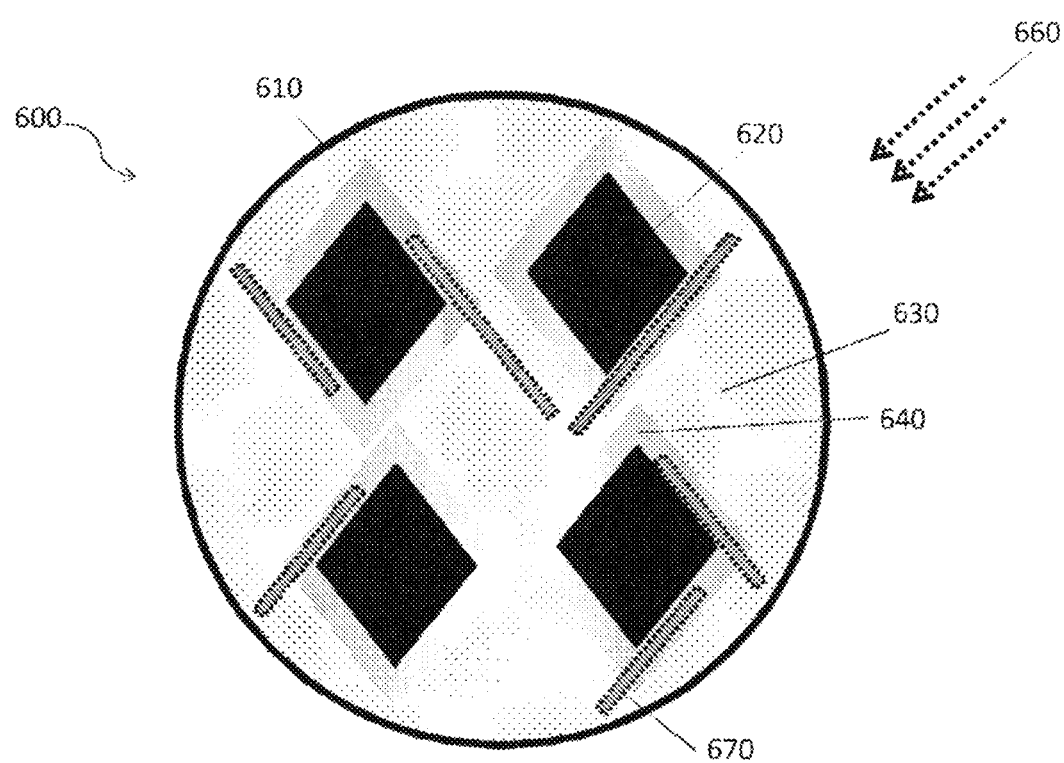
FIG. 19 schematically depicts sealing of the incorporated material within the heterogeneous solid and partial reversal of permeabilization on changing the applied energy.

As shown in FIG. 19, the applied energy can be changed to seal the infiltrated heterogeneous solid 600. Changing the applied energy 660 (for example, reducing the energy applied to the heterogeneous solid 600) can result in at least a partial reversal of the changes in earlier steps, leading to an at least partial reduction of the permeabilized regions 670 (for example, an at least partial collapse of the tunnels). In some embodiments this collapse seals the incorporated permeating substance from the surface 610 of the heterogeneous solid. This can place strain on the permeabilized regions 670 and the incorporated permeating material. In this process the permeating material can enter the bulk of the amorphous phase 630, but can remain separate from the crystalline or semi-crystalline phase.

Figure 20:
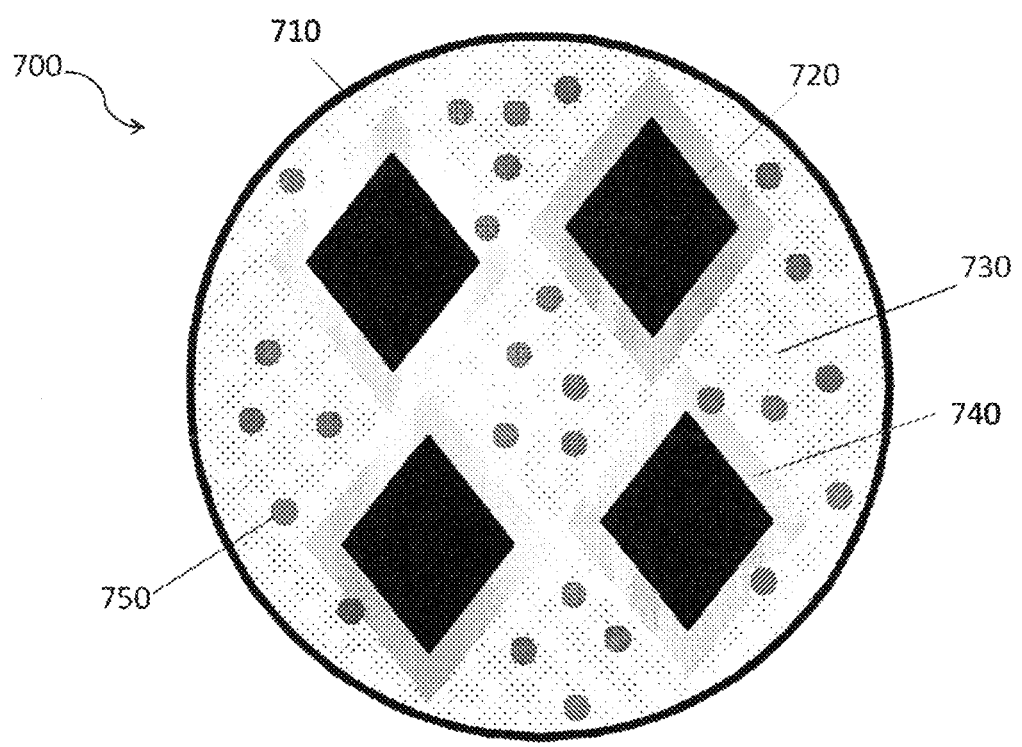
FIG. 20 schematically depicts dispersal of the incorporated material within the heterogeneous solid to produce a composite solid.

FIG. 20 depicts the infiltrated heterogeneous solid following the application of the energy. The permeating substance 750 is dispersed within the amorphous phase 730 by the stress induced by the reduction in permeability of the interface region 740 (for example, due to the collapse of tunnels). While permeating substance can be found in the interface region 740 it does not enter the crystalline or semi-crystalline phase 720. Application of the permeating substance can be controlled such that essentially all of the permeating substance is incorporated into the heterogeneous solid to form a composite solid 700, leaving little or no permeating substance on the surface 710. The resulting composite 700 advantageously provides a solid with the desired optical, pharmaceutical or other properties of the permeating substance while providing the environmental, chemical, and biological resistance of the heterogeneous solid.

A number of specific conditions and specific applications include the following:

Photons

The use of frequency resonance as a method of material identification using Fourier transform infrared spectroscopy (FTIR) devices is an established practice. Such resonant frequencies are useful to stimulate the uptake of permeating substances (such as dyes) into heterogeneous solids (such as fibers). Using electromagnetic energy (such as near infrared photons) to stimulate the enthalpies of formation of the dye and the receiver in separate emissions allows rapid activation in depth of both the dye and the receiver, and reduces the time required to infiltrate a dye into a receiver fiber or fabric to less than 10% of the time required when using radiated thermal energy. The time required to infiltrate dye into a receiver fiber or fabric using electromagnetic energy or photons can be equal to or less than about 5% of the time required when using radiated thermal energy.

Reduced Pressure

Air pressure inhibits the phase change of dye and the formation of tunnels in the receiving heterogeneous solid. Reducing air pressure through the formation of a vacuum environment during a coloration process substantially improves the efficiency of the energy source. Tests have shown that the tri-point for phase change is reduced by about 7° C. for every 10% (kPa/kPa) reduction in air pressure. This advantageously permits the use of lower energy emitters and the activation of inert dyes previously thought to require too much energy for polymer coloration. Use of reduced pressures also supports the use of electrostatic interactions in coating processes. Pressure can be reduced during steps of the process to about 90%, about 80%, about 70%, about 60%, about 50%, about 40%, about 30%, about 20%, about 15%, about 10%, about 5%, about 2%, about 1%, about 0.1%, about 0.01% or to less than about 0.01% of ambient air pressure.

Electrostatic Attraction

Under certain conditions dyes and other permeating materials or substances can be introduced to the receiving heterogeneous solid by vaporizing micro-particles in a reduced atmospheric pressure chamber and attracting them to an opposing charge in the dielectric receiver. This process has particular utility for permeating substances that may not tolerate more traditional transfer processes, such as pharmaceutical compounds, biomolecules (such as proteins and nucleic acids), and polymers.

Figure 21:
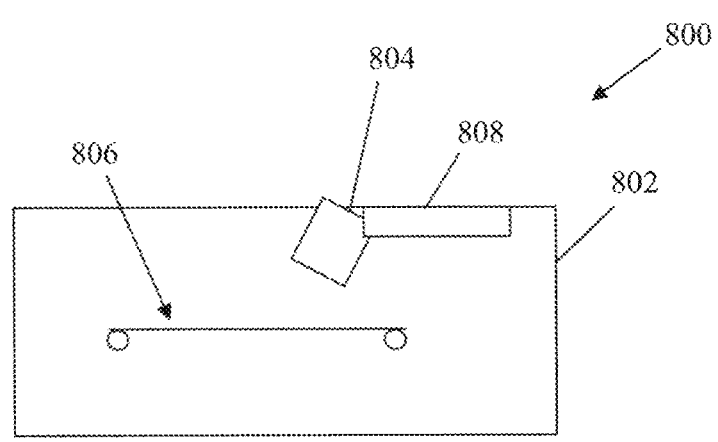
FIG. 21 depicts one embodiment of a system that allows dispersion of a substance within a material.

FIG. 21 illustrates one embodiment of a system 800 for applying a permeating substance to a material 806. Systems can include a device 802 configured to receive the material 806. It is contemplated that material can be passed through the device 802 such as via rollers or other means. In another embodiment, material can be received via an automated system such as a mechanical arm that presents a piece of material to which the permeating substance will be applied. Of course, the material could also be manually placed within the device 802.

Materials can comprise amorphous regions and crystalline or semi-crystalline regions with one or more interface regions disposed therebetween. Contemplated materials include, for example, synthetic polymers, and could be in the form of fibers, threads, yarn, elastics, fabrics, webs, or even finished products such as shirts, pants, webbings, elastic webbings, ribbons, elastic strap body 102, and so forth.

Device 802 includes one or more energy sources 804 that are configured to emit energy on to at least a portion of a material 806, such as elastic strap body 102. The energy emitted by the energy source(s) could be, for example, heat, electromagnetic radiation, and infrared or near infrared radiation (e.g., between 750 nm-1400 nm). The energy emitted on to the material 806 can be of an amount sufficient to render the interface region temporarily permeable such that a permeating substance on a surface of the material can infiltrate into the interface region. The amount of energy can be within a Boson peak region of the material and can be near the Boson peak for that material, which can be determined via known techniques that characterize parameters dependent on the number of degrees of freedom available to atoms or molecules within the material, such as those described above.

The permeating substance preferably comprises one or more dyes, for example dyes that will form logo 103, but could also include numerous other types of permeating substances including, for example, a pharmaceutical, a polymer with advantageous properties, a metal, and so forth.

As the applied energy falls within the Boson peak region of the material 806, the interface region is rendered permeable due to the formation of one or more tunnels that allow the permeating substance to infiltrate within the material beneath the material's surface. The permeating substance can be drawn into the material via a driving force, which could include, for example, capillary action or a ripplon. Once within the material, the amount of energy will typically be reduced to an amount outside of the Boson peak region of the material, which causes the tunnels to collapse returning the material to its previous state.

Device 802 can further include a controller 808 that is configured to control the amount of energy emitted from energy source 804. In such embodiments, the controller 808 can be configured to automatically increase the amount of energy to fall within the Boson peak region of the material 806 and then reduce the energy applied after the permeating substance infiltrates the material 806 in an amount desired by the operator.

It is further contemplated that the energy can be applied to the material 806 in a partial vacuum, which reduces the amount of energy required to cause the interface region to become permeable. This advantageously allows for a wider selection of materials to be used in the systems and methods described herein, including those materials that typically could not undergo prior art dyeing methods due to the high temperature required in the prior art processes. In other embodiments, a partial vacuum can be applied on only one of the sides of the material 806. When the interface region becomes permeable air can enter through the tunnels creating an air pocket within the material. Where the system is configured to allow for dyeing of both sides of a material, this advantageously allows for different colors of dye to be used with the air pocket helping to prevent mixture or bleeding of the dyes from opposite sides.

The printing method to print logo 103 onto strap body 102 can use colorant that is applied directly to a formed or finished product, such as strap body 102 or it can be applied to a filament, such as a thread, yarn, twine, ribbon, elastic, or other substantially linear and flexible component that can be woven into a formed or finished product, such as a fabric, mesh, webbing, elastic webbing, or other desired material. Such a filament can have a polymeric composition. Suitable polymers include naturally occurring polymers (for example, cellulose or silk), synthetic polymers (for example, polypropylene, polyester, or polyamide), and/or a combination of these. In some embodiments the filament is composed of two or more sub-filaments or strands that are coupled to one another, for example by winding the sub-filaments around one another, so that they move and are processed as a single filament. As discussed above herein, in many cases, these yarns are composed of multiple layers of filaments grouped or twisted together for strength and durability and can be produced in any number of combinations, with as few as two or three filaments up to 50 filaments or more for apparel applications. A common combination for an elastic strand is often found to be 34, 36, 44, 48, and 68 (microfiber) filaments. For narrow elastic webbings, it is common to have these strands contain 34 or 36 filaments. The size of these strands or yarn is measured in "denier" with higher numbers representing increasing thicknesses. It is also common to texture the yarn to increase its volume and to instill other desired properties, such as air and vapor permeability, smoothness and a more compliant feel.

To produce an elastic fabric, the elastic material is then knit or woven in combination with other elastic and non-elastic materials such as polyester, nylon, cotton, Kevlar®, rubber (natural latex), polyisoprene, neoprene, spandex, silicone, acrylic, olefin, acetate, rayon, orlon, lastex and/or other materials. The elastic yarns can be positioned in a lengthwise or longitudinal direction (warp), or in a latitudinal or transverse direction (weft or woof) with other elastic or non-elastic materials positioned in the opposite direction. These elastic fabrics can be made in a diverse combination of constituent materials and in a wide variety of styles for different applications.

Selection of the right elastic material for strap body 102 is important, as certain materials will work better with elastomeric strap 100 than others. Since the subject of elastomeric strap 100 will be used by people holding elastomeric strap 100 in and around their hands and washed from time to time, spandex is a better choice in contrast to natural rubber, as rubber does not last as long, especially when it comes into frequent contact with perspiration and chlorine, and some people are allergic to it. To gain additional desirable properties, such as water resistance, antimicrobial/antibacterial protection, etc., other treatments and materials could also be considered to improve the strap's performance and preserve its integrity and durability.

A device for processing a single fiber can be used. Other embodiments include systems that include two or more of such devices operating in parallel. As such, descriptions of the various components and operations below are applicable to the features and operation of both device and system.

Figure 22:
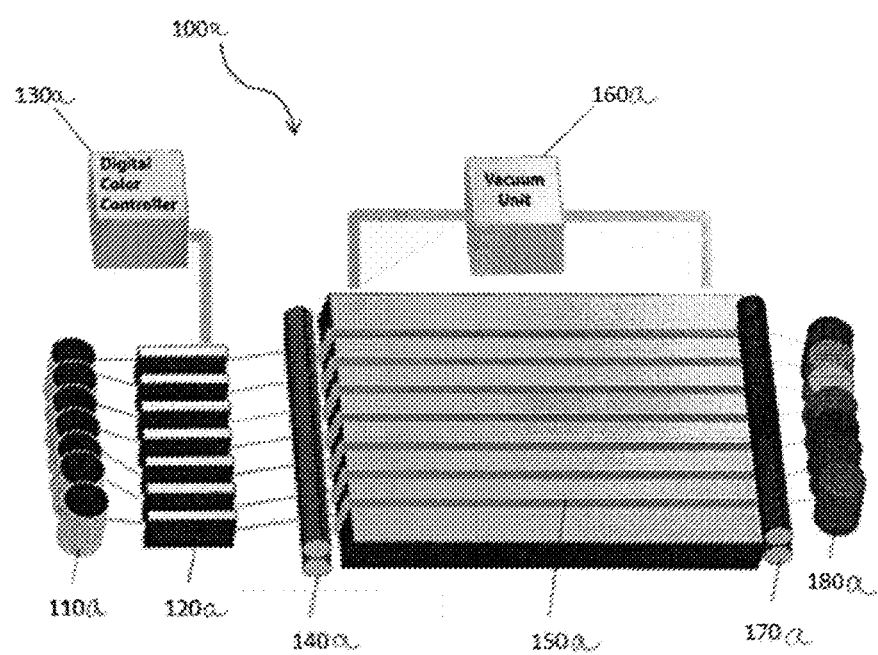
FIG. 22 schematically depicts an embodiment of a system, in which multiple fibers are dyed simultaneously.

FIG. 22 provides a schematic representation that depicts a system 100*a* that processes seven of such filaments simultaneously. Descriptions directed to a single filament are understood to be potentially applicable to all filaments being processed within such a system, in concert or independently, unless stated otherwise. A filament is supplied by a source 110*a*. Such a source can be a reel, spool, hank, or similar arrangement or reservoir capable of supplying the filament in an untangled manner. In some embodiments the source can be a mechanism that produces the filament from a raw material as needed, for example a mechanism that receives cotton, spins the cotton into strands, and winds the strands into a cotton thread that is supplied to the system as a filament.

From the source the filament moves through a colorant application unit 120*a*. The colorant application unit dispenses numerous small-volume (i.e., 0.1 to 100 pL) microdroplets of colorant onto the filament as it moves through to produce a coated filament. The volume of a colorant microdroplet can be 1 to 1.5 pL. At these volumes the colorant is dry before the coated filament (or the coated portion of the filament) leaves the colorant application unit. The colorant can be dispensed by any suitable means, but is preferably dispensed using a MEMS print head that is in fluid communication with one or more sources of colorant. Such devices provide accurate and reproducible dispensing of suitably small volumes, and provide an area over which the colorant can be dispensed that is substantially larger than that of other microdispensing methods (for example, micropipettors and conventional ink jets). Such a large dispensing area supports rapid processing speeds. A filament can move through a colorant application unit at a rate greater than or equal to 100 meters per minute.

In a system such as shown in FIG. 22, a colorant application unit 120*a* or a set of colorant application units can be controlled using a digital color controller 130*a*. The digital color controller can be used to instruct a colorant application unit to change the colorant that is applied to a filament as it moves through the colorant application unit. This can be accomplished by changing the source of colorant that is supplied to a print head. Alternatively, this can be accomplished by switching from a first set of dispensing nozzles of a print head that are dispensing a first colorant to a second set of dispensing nozzles of the print head that are dispensing a second, different colorant. A colorant application unit can change the colorant that is dispensed to a filament while leaving a gap of about 10, 8, 6, 4, 2, or less than 2 cm between the portions of the filament over which the first colorant and the second colorant are dispensed. In some embodiments concept print head (or similar device) of a colorant application unit can dispense two or more colorants to the same region of the filament, producing a blended result. In still other embodiments, the digital color controller can instruct the colorant application unit to dispense different amounts of the same colorant to the filament, thereby varying the intensity of shading along the length of the filament. This can be achieved, for example, by adjusting the rate at which the microdroplets of dye are dispensed and/or adjusting the volume of the dispensed microdroplets.

It should be appreciated that the use of such a colorant application unit dramatically reduces the amount and the volume of colorant that is applied to a filament relative to conventional dyeing processes. Additional features can reduce this even further. For example, the MEMS print head can be controlled such that only nozzles that are in contact with or in immediate proximity (i.e. less than 1 cm) to the filament are activated to dispense colorant. In some embodiments the colorant application unit can impart a charge to the filament and an opposing charge to the dispensed colorant, so that the dispensed droplets of colorant are impelled onto the filament. In such an embodiment interior walls of the colorant application unit can carry a charge that matches that of the dispensed colorant droplet, repelling the colorant from the walls of the colorant application unit and reducing the need for cleaning and other maintenance. Colorant application units can be provided with filter, forced air, and/or vacuum resources that serve to remove or segregate colorant that failed to adhere to the filament on colorant dispensing.

Colorants can be any material, either liquid or in liquid suspension, that the user wishes to incorporate into or bond to the filament. For example, a colorant can be a disperse dye or suspension of disperse dye in a suitable solvent. Alternatively, a colorant can be a reactive dye. It should be appreciated, however, that systems and methods can also be used to incorporate other functional molecules into a filament, for example UV protectors, conductive materials (i.e. metals, graphites, fullerenes, nanotubes, and other carbon clusters), water repellants, insect repellants and/or insecticides, and pharmaceuticals (for example steroid hormones, estrogens, androgens, acetylcholinesterase inhibitors, stimulants, antidepressants, insulin or insulin analogs, vitamins, nicotine, scopolamine, and/or analogs thereof, antiseptics, antibiotics, anticoagulants, tissue growth and/or trophic factors, etc., and any combinations thereof).

As shown in FIG. 22, on exiting the colorant application unit 120a the coated filament is directed to a colorant infusion unit 150a. In doing so the coated filament can be passed through a preheating unit 140a, for example a set of heated rollers. Such heated rollers can also form part of an impelling mechanism that moves the filament through the system. A colorant infusion unit includes one or more sources of infrared radiation. Such a source can be a source of electromagnetic radiation (EM radiation) that provides electromagnetic energy in the wavelength range of 700 nm to 1 mm. Alternatively, such a source can be a resistive heater. The colorant infusion unit includes both EM radiation sources and resistive heaters. In some embodiments the EM radiation source can provide two or more wavelengths, for example by energizing different sets of EM radiation emitters (for example LED or laser sources) or by the use of a wavelength selector (for example, a diffraction grating or interferometer).

A colorant infusion unit 150a is operated at reduced, i.e. below, ambient air pressure. Towards that end such a colorant infusion unit is in communication with one or more vacuum units 160a that serve to exhaust air from the colorant infusion unit. Reducing the pressure surrounding a coated filament greatly reduces the energy (in the form of infrared energy, heat, or a combination thereof) necessary to incorporate or draw the colorant into the filament. The pressure within such reduced pressure portions of the system or device can be about 759, 700, 600, 500, 400, 300, 200, 100, 30, 10, 3, 1, 0.3, 0.1, or less than about 0.1 Torr. In order to efficiently maintain a low pressure environment within the colorant infusion unit as the filament moves through, the filament can pass through an area or stage that is evacuated using a pump that is capable of moving large quantities of air but does not maintain a high vacuum (for example, a rotary pump) and then through a second area or stage that is evacuated using a pump that is capable of maintaining a high vacuum but that does not move large volumes of air (for example, a cam or a piston pump). The two vacuum stage sections can be separated by a sealing device (for example, a pair of silicone rollers) that reduce air loss between the vacuum stages as the filament moves through the sealing device. A similar set of vacuum stages can be supplied at the exit of the colorant infusion unit. In some embodiments, the rollers of such a sealing device can form part of an impelling mechanism that moves the filament through the system.

Inside of the colorant infusion unit the coated filament is subjected to EM radiation, temperature, and vacuum conditions that either draw the dye into the interior of the fiber (in the case of disperse dyes) or permit the dye to chemically react with the filament (in the case of reactive dyes). Such conditions can be selected so that the energy (in the form of EM radiation and/or heat) lies within a boson peak characteristic of the energy absorption of a polymer of the filament. For example, polymeric filaments can have heterogeneous structures that include a highly crystalline phase in the form of inclusions within a less organized and relatively amorphous phase. An intermediate region lies between these phases. As energy (in the form of EM radiation and/or heat) is added to such materials a boson peak, or deviation from linearity, is often observed in a graph of energy added to the material versus the degrees of freedom available to molecular species of the material. Such a boson peak coincides with the development of tunnels or channels within the polymeric filament (generally at least partially within the intermediate regions), at least some of which extend to the exterior of the filament and can permit a colorant coating to enter the interior of the filament. Application of a vacuum to such materials reduces the amount of energy that needs to be applied to reach such a boson peak, bringing it into a range that is compatible with colorant materials and polymers commonly used in filament production. A subsequent reduction in the energy applied to the filament results in the collapse of the tunnels or channels, which serves to trap the colorant within the filament and disperse it throughout the interior of the filament. The colorant can be selected to be fluidly mobile at EM radiation and temperature conditions corresponding to a boson peak of a polymer of the filament. It should be appreciated that a colorant infusion unit can be controlled to provide such conditions for a wide variety of polymeric materials. The filament, the colorant, the dispensed amount of colorant, and the conditions within the colorant infusion unit can be selected so that essentially all (i.e. >90%) of the colorant applied to the filament migrates to the interior of the filament. This advantageously minimizes or, preferably, eliminates the need to wash or rinse the filament following colorant infusion.

Similarly, a colorant infusion unit can be controlled to provide EM radiation, temperature, and vacuum conditions that permit reactive dyes to form chemical bonds with a polymer of a filament. The filament, the colorant, the dispensed amount of colorant, and the conditions within the colorant infusion unit can be selected so that essentially all (i.e. >90%) of the colorant applied to the filament forms a chemical bond with a polymer of the filament. This advantageously minimizes or, preferably, eliminates the need to wash or rinse the filament following colorant infusion. In some embodiments, for example where a colorant application unit has switched from applying a disperse dye to applying a reactive dye to a given filament, a colorant infusion unit can change EM radiation, temperature, and/or vacuum conditions as a filament moves through it.

On exiting the colorant infusion unit, the colored filament can pass through a polishing unit 170*a*. Such a polishing unit can, for example, apply a wax, polish, or other similar coating that simplifies handling and/or processing of the colored filament in subsequent steps. The final colored filament can be transferred to a take up reel 180*a*, where it is stored prior to use. In some embodiments of the inventive concept the take up reel can form at least part of an impelling mechanism that serves to move the filament through the system. For example, tension supplied by a rotating take up reel can serve to draw the filament from the source and through the colorant application unit and the colorant infusion unit at a desired rate (for example, 100 meters per minute or faster). Alternatively, the final colored filament can be supplied directly to a fabrication unit, for example a knitting machine or a loom, that generates a fabric, mesh, webbing, ribbon, or similar woven product, including a flat elastic webbing such as strap body 102. In such embodiments a feed mechanism of the fabrication unit can form at least part of an impelling mechanism that serves to move the filament through the system.

It should be appreciated that the digital color controller can configure the system to produce a multiple-dyed filament, such that the dyed segments of the filament form a desired pattern in the final fabric or mesh, such as for example, logo 103 within elastic strap body 102. Towards that end, a gap between such colored segments can serve to provide indicia to an automated knitting machine or other fabricating unit of an impending change in the colorant applied to the filament. The digital color controller can be configured to supply indicia regarding the nature of the subsequent colorant within such a gap, for example by encoding such information using a UV-visible colorant not readily perceived by a consumer.

In addition to printing on a filament that is then incorporated into a final product, such as a fabric, mesh, ribbon, webbing, or elastic, it should be further appreciated that the system shown in FIG. 22 and described above can be modified and configured to print directly onto any such final product, such as a fabric, mesh, ribbon, webbing, elastic, or other suitable material, such as printing a logo, such as logo 103, onto a flat elastic webbing, such as onto elastic strap body 102.

Without limiting all the many advantages to be summarized later, there are essentially 6 primary features/benefits provided by elastomeric strap 100: (i) Operability—elastomeric strap 100 improves the user's ability to better operate their phone by making it easier to access a larger portion of the smartphone's screen, while holding the phone more securely and confidently, (ii) Adjustability—elastomeric strap 100 is quickly and easily adjustable, without tools or adhesives, for a more customized and secure fit made possible by a strong and reliable hook and loop closure system, (iii) Comfortable—elastomeric strap 100 is thin, flexible, soft, and comfortable on the hand and fingers across a range of versatile positions, yet very strong to help protect the phone, (iv) Elastomeric—elastomeric strap 100 is elastic to provide tension to help the user more easily hold their phone, while reducing hand and finger fatigue, (v) Streamlined—elastomeric strap 100 has a streamlined profile, without bulky, rigid attachments, and, as a result, is pocket friendly, and (vi) Promotional—elastomeric strap 100 has the potential for unprecedented corporate/organizational promotion and personal expression.

Operability—Elastomeric strap 100 is a flexible woven elastic that allows the user to stretch, reach, twist, and place their hand in any number of needed positions to properly access different parts of the screen, especially areas that were previously difficult to reach. More rigid competitive products do not allow this level of flexibility. Most people hold and use their smartphone with their right hand and primarily try to thumb-touch all over the entire screen, as needed. This can be difficult, especially with the larger phones. In fact, Apple, Inc. tried to help with people's inability to thumb-touch the top of the screen by allowing users to double tap the home button lightly (not down all the way), causing the top of the screen to drop down about 40% for a few seconds to enable users to access the upper regions of the screen. Unfortunately, this is not an adequate solution and light double-tapping through a long period of use can quickly become annoying and increasingly difficult. The strap of the current disclosure can be used with the whole hand (either right or left) or with any number of fingers, which is important as it allows the user to find the best positions for them to better reach and use all areas of the screen. This level of flexibility is a significant advantage over competitive products, as those other products often need the same fingers to be used each time in the same basic position and this restriction limits overall use, functionality, and comfort.

Adjustability—Elastomeric strap 100 is fully adjustable, meaning that once a user installs it to case 202, elastomeric strap 100 can be easily tightened or loosened as desired for a precise fit to the user's hand or fingers. Elastomeric strap 100 works with camera port 300 and with any portal on the bottom of phone case 202, i.e., speaker port 500, power port 502, or headset/microphone port 504, to customize the fit to each user's hand, whether they primarily use their phone with their left hand or right hand. This level of adjustability seems to be completely absent from all other commercial products, yet is one of the most important features. Most other products glue/adhere to the back of the phone or case and once stuck they are semi-permanent in that position. If you do not like the position you initially affixed it to, you must peel it off and try again. It has been asserted that these products are easily removable and re-sealable, but this is cumbersome and likely weakens the adhesive's ability to continue to adhere over time, thereby lessening the security that the competitive products offer and accidents can result. Elastomeric strap 100 does not use any glue or other adhesive to firmly grip the back of a user's case and adjusts very easily, quickly, and securely. Simply remove case 202 from mobile device 200, tighten or loosen the tension by moving first fastener 104 relative to second fastener 108 to decrease or increase the size of the loop, respectively (as measured in its resting position when disconnected from case 202), and you have a new fit, which you can continue to customize, as needed, for your entire length of use and ownership. As a result, elastomeric strap 100 is easy to install, readjust, or even remove elastomeric strap 100 and put on a different elastomeric strap 100. Once attached, elastomeric strap 100 is very durable and will hold tight with the same relative level of strength and tension for a long time.

Comfortable—Elastomeric strap 100 enables users to find many comfortable positions to hold and operate mobile device 200 for hours every day, which is critical to everyone's effective use and enjoyment of these important mobile devices. The heavy use of mobile device 200 can lead to hand and finger fatigue and possible joint injury, e.g., injury of the thumb, so finding comfortable positions for use is critical. Elastomeric strap 100 is made of a thin, soft, comfortable, woven fabric that moves and flexes with the user's various hand positions as they engage with more areas of the entire screen, and, most of all, it holds the phone comfortably secure to a user's hand because of the elastic's ability to provide the needed tension. Other non-elastic competitive products lack this advantage, which is a significant drawback to their long-term use, comfort, and functionality. Elastomeric strap 100 is one of the most comfortable solutions for long-term use of mobile device 200, in contrast to products that are made of metal or hard plastic, which can make one's finger(s) sore with extended use.

Elastomeric—Elastomeric strap 100 does not contain a glued or adhesive surface to affix it to the case, as strap body 102 is not glued to the inside or the outside of the smartphone's case. Strap body 102 is a strong and secure elastic webbing, so once it is installed on case 202 it rests snugly under tension against the back of case 302 when it is not in use. In contrast, a strap body that is non-elastic makes the strap body floppy when not being used, since it must be sized with the user's hand or fingers under it before being affixed to the case. When the user's hand or fingers are removed, the strap naturally flops freely, as there is no elastic to return the strap to a snug resting position against the back of case 302. Since strap body 102 has an elastic core, it has a memory and returns to its resting position after the user's hand or fingers are removed. As a result, the elastic of strap body 102 creates a completely different product functionally. Also, from a comfort standpoint, a non-elastic strap body requires a user to exert a certain level of hand pressure to create tension to hold the phone properly or the size of the loop would need to be fairly tight, whereas the elastic of strap body 102 creates the needed tension to assist in holding the phone, effectively reducing hand and finger fatigue, and possibly, future joint injuries. This distinction is important. For example, if a loop is sized for only one or two fingers under a non-elastic strap body, then there is not sufficient room to use more fingers or even one's whole hand. Also, if another person was to borrow that phone and they had a different size hand or used a different number of fingers, they would not be able to comfortably or even effectively use that non-elastic support device. With strap body 102 being elastic, it easily stretches to accommodate one or more fingers, the user's whole hand, or someone else's hand, and its elasticity is flexible enough to quickly adjust to changing positions, such as moving from one or more fingers to the whole hand and back again, as the user experiments to find the most comfortable positions for the phone's specific use/application at any given time. This difference between the elastic nature of strap body 102 and the non-elastic nature of competitive products is significant, and users will immediately appreciate the difference in comfort and function afforded by elastic strap 102.

Streamlined—Elastomeric strap 100 has a tight, flat and streamlined profile that is pocket friendly, i.e., it does not impede the ability of mobile device 200 attached to case 202 to easily slip in and out of a user's tight pocket or bag. Unlike other competitive products, elastomeric strap 100 is not attached to a thick plastic plate that glues or adheres to the back of the phone or case, nor does it use a protruding finger ring or bulky telescoping post or disk. Not only are these competitive products not easily removable or adjustable on a frequent basis, but the plastic or metal material adds bulk to the profile of the mobile device and case and provides a catch point that often snags on the edge of certain tight clothing. This catch point makes it difficult and frustrating to easily slip a user's smartphone in and out of their pocket, especially a back pocket, which is primarily used by females for their smartphones, since many pants tailored for women, such as jeans, do not provide sufficient room in their front pockets to comfortably put their smartphone. The elastic nature of strap body 102 and the flat, streamlined hook and loop closure system of first fastener 104 and second fastener 108 provides multiple benefits, including the ability for strap body 102 to lie flat and tight against the back of case 302, making what is believed to be the most streamlined profile of any phone support on the market. As a result, the user can also put their smartphone down on a flat surface, such as a tabletop, and continue to use the phone and its many features, whereas other products cause the phone to teeter on an angle and make it very difficult, if not impossible, for the phone to securely lie flat, screen up, since their structures on the back of the case are so pronounced. In addition, the thin, flat, and smooth nature of strap body 102 in combination with its flat, streamlined hook and loop closure system permits this portion of elastomeric strap 100 to be easily sandwiched in and securely held between smartphone 200 and case 202.

Promotional—One of the best attributes of elastomeric strap 100 is the special nature of the woven stretchable and printable fabrics of elastic strap body 102 described in this disclosure, and, in particular, the ability for logos, as defined earlier, represented by logo 103, to remain visibly identifiable/recognizable and only minimally or not at all deform upon stretching strap body 102. This ability of elastic strap body 102 to be able to receive printed logos that are durable and long wearing, and to preserve the integrity of these logos during use when elastic strap body 102 is stretched, is critical to the commercial value of this innovative promotional tool for the benefit of all company/organizational sponsors, and their customers, potential customers, and members for their personal expression. Elastomeric strap 100 provides unprecedented promotional and advertising advantages by enabling the user and others nearby to be able to easily see a company's name and logo both during use, and during non-use, when the phone is lying on a table with its screen face down, which is a typical resting position for the phone to preserve privacy. Logo 103 can represent any logo, as defined earlier, that can be replicated on the strap, allowing the user a means of personal expression or to voice support for their favorite company, brand, non-profit, sports team, cause, or other passion, as they may desire. Since users check their smartphones up to 150 times per day and spend in the range of 4-5 hours per day in total on them, the back of these phone cases provides the greatest untapped real estate for personal expression, brand promotion, advertising, and messaging available anywhere. As a particular advantage to companies, elastomeric strap 100 provides the ability to have a company/organization's name, brand, website URL and/or message represented by logo 103 within arm's reach of their customers and potential customers continually throughout the day, where they can easily see, handle, and engage with logo 103. With views of a company's brand, represented by logo 103, of nearly 55,000 (150×365) potential impressions annually to the user alone, not counting many additional impressions to others in the user's circle of influence, the innovation of elastomeric strap 100 can provide an entirely new venue for brand promotion, advertising, and messaging.

Using both sides of the elastomeric strap 100 for marketing purposes further permits companies/organizational sponsors to customize their promotional message for smartphone use. Each side of the strap could have a different logo. For example, one side of the strap could have the company/organization's name and corporate logo, such as Nike® with its classic swoosh, while the reverse side could have a corporate tagline, such as Nike's "Just Do It". This opportunity for dual branding on two different surfaces relative to back of case 202 is non-existent among competitive products on the market and it provides twice the advertising/promotional space and value versus one place for a single name or message. It provides the company/organizational sponsor the opportunity to further customize its message to consumers, delivering a more targeted promotional appeal for greater impact. Not only is this a significant advantage to the company/organizational sponsor, it allows the user the choice of how to represent the company/organization that it supports. The user could change the strap's orientation and present one side/logo versus another, and in some cases both sides/logos can be visible during periods of the same use. For example, as the user inserts their hand between strap body 102 and the back of case 202, this action, especially when there is an increased tension on the strap, might cause the strap to temporarily twist revealing the logo on the other side. Even during this rotated state, elastomeric strap 100 maintains its strength, comfort, flexibility, and functionality, and logo 103 on the reverse side of strap body 102 remains visibly identifiable/recognizable and is minimally or not at all deformed upon the stretch and twist of strap body 102. As the user removes their hand, the typical top side of the strap, which was temporarily facing in the direction of outer surface 302 on the back of case 202, will flip around to its normal position to again present the first logo. This non-digital form of smartphone advertising, and especially with its dual-logo/messaging potential, might be as or even more effective in driving customer engagement than traditional digital marketing search and app generated advertisements that are only seen by the user infrequently. This promotional potential provides a unique new venue for all companies and organizations who want to advertise their brands/logos in a place that gets frequent notice by customers, potential customers, organizational members, and those around them. Such use also permits the user to be not only a supporter of that sponsor's brand, products, services, and mission, but also an endorser, which is the highest form of recommendation most desired by companies and organizations for their products, services, and/or causes. With users checking their smartphones up to 150 times per day, used correctly, this new promotional venue provides one of the most powerful, visible, and cost-effective means of keeping a sponsor's logo, name, message, and identification in front of their customers, potential customers, and organizational members nearly all the time and could generate significantly higher levels of engagement and support from consumers/users than other forms of traditional media or digital/online advertising, where each company's advertising/logo is only seen occasionally. The opportunity is enormous since 80% of smartphone users check their smartphone within 15 minutes of waking up, and 79% of adult smartphone users have their phones with them for 22 hours a day. https://blogs.constantcontact.com/smartphone-usage-statistics/

Promotional benefits of elastomeric strap 100 to corporate/organizational sponsors include: (i) enables companies and organizations to more effectively engage with their customers, potential customers, and organizational members by having their logo, as defined earlier, continually in front of their customers, potential customers, and members up to nearly 55,000 customer impressions per year (150/day× 365), and potentially reach new customers or prospective members in the users' circle of influence, (ii) provides a durable means for long-term use for logos 103 to remain visibly identifiable/recognizable and only minimally or not at all deform upon stretch of strap body 102, (iii) captures the highest value, untapped real estate for promoting brands, companies and organizations, features, benefits, and value, (iv) provides a new and innovative marketing opportunity for companies to advertise products and services and for organizations to convey their message, (v) provides constant brand visibility to increase customers' and potential customers' top-of-mind awareness to secure the brand's positioning and value in their customers' and potential customers' mind, (vi) develops a more personal connection to customers, potential customers, and members by directly associating that corporate/organizational sponsor's name with its customers', potential customers', and members' improved smartphone experience, including avoiding a potentially inconvenient and expensive accident, (vii) reduces and replaces costly and ineffective advertising and simplifies the corporate/organizational sponsor's marketing mix to achieve greater reach and effectiveness where the inexpensive cost to provide elastomeric strap 100 is greatly exceeded by the potential benefits to their customers and potential customers, (viii) provides an inexpensive means to deliver maximum promotional impact at an extremely low cost per consumer impression, and (ix) can transform customers, potential customers, and members into endorsers.

A target audience for elastomeric strap 100 is all consumers who use a smartphone with a case, especially those who predominately use one hand to operate their phone, regardless of age or geography, all users who desire a new venue for personal expression, and all products/services companies and other organizations, especially those who want maximum long-term brand visibility and engagement with their customers, potential customers, and members at the lowest cost, regardless of business, mission, or geography. In light of the comfort, flexibility, adjustability, and other functional attributes of elastomeric strap 100, young children, the elderly, and others with compromised hand strength or grip function will especially appreciate the benefits and ease of use afforded by the present disclosure.

The printable elastic nature of strap body 102 in combination with its flat, adjustable, hook and loop closure system, namely, first fastener 104 and second fastener 108, in combination, securely held between the smartphone 200 and case 202, provide the unique ability to obtain all the other benefits mentioned above, offering the user many options not afforded by other products. Only elastomeric strap 100 employs all of the features mentioned above, together and usable at the same time.

In summary, the functional benefits to users of elastomeric strap 100 include: (i) enables users to hold, control and use most cased smartphones more easily, comfortably, securely and effectively, especially with one hand, and even when combined with other activities in the user's life, such as walking, running, working out at the gym, watching videos, listening to music, talking, texting, reading, shopping, relaxing, on the go, etc., (ii) comfortable, flexible, and adjustable for short and long-term use, (iii) permits more effective control during use of all normal smartphone apps and online activities, (iv) allows greater one-handed thumb-touch use, making more areas, especially hard to reach areas of the smartphone screen, more accessible, (v) makes all typical one-handed functions and operations easier to do, especially taking photos and selfies, (vi) reduces hand and finger fatigue, (vii) can be used with any number of fingers, the whole hand or with either hand, and in any number of various hand-holding positions, (viii) convenient, and readily-available for immediate use, (ix) adjusts to different tensions and positions, (x) protects the phone by reducing the tendency to drop or lose the phone, (xi) flush profile for easier phone use and storage, namely, easy to hold during use and rests securely on flat surfaces for routine functions, ex. calculator, scrolling, etc., (xii) pocket friendly, especially with tight pockets, (xiii) flexible elastic material holds securely to the hand during use and to the case when not in use, (xiv) logoed to promote and provide a medium for personal expression and corporate/organizational branding where such logos remain visibly identifiable/recognizable and only minimally or not at all deform upon stretch of strap body 102, (xv) easily interchangeable to tailor the user's personal expression to different situations, and (xvi) provides an inexpensive solution to an expensive and inconvenient problem, namely, reducing upwards of 2 billion expensive smartphone accidents by 2020 and reducing costs for repairs and replacements costing over $3-$4 Billion annually.

Other than the subject of this present disclosure, it is believed that no other disclosure in the prior art, concepts that have been patented to date, or commercially available competitive devices designed to assist in holding and using a smartphone, offer the simultaneously combined features, advantages, and benefits of flexibility, ease of installation and removal, adjustability, comfort, convenience, adaptability, cost-savings, and opportunities for personal expression by users, along with the unprecedented marketing advantage afforded to companies and organizations in this new digital age for efficient and cost-effective branding and advertising.

In addition to the elastomeric fabrics disclosed above, additional non-fabric materials with elastomeric properties would also be suitable for use in the present disclosure. These materials could include a wide range of potential plastics, polymers, elastomers, silicone plastics, silicone rubbers, thermoplastics, thermoset plastics, thermoset elastomers (rubber) and other substances with elastomeric properties, to the extent that they can be processed and deployed in such a way as to provide elastic properties with the capability of printing logos on them that remain visibly identifiable/recognizable during use and that minimally or not at all deform upon stretching the elastomeric strap, and that such materials are suitable for wearable human use. Amorphous polymers with a glass transition temperature below room temperature could also work in the present disclosure. These above materials also may be further modified by chemical bonding, including crosslinking, to exhibit the desired elastomeric properties with the ability to print logos on them that remain visibly identifiable/recognizable during use and that minimally or not at all deform upon stretching the elastomeric strap. Common additives, such as antimicrobials, antistatics, plasticizers, pigments, UV stabilizes, fillers, and flame retardants might also be added to these above materials to obtain specific desired properties.

Figure 13:
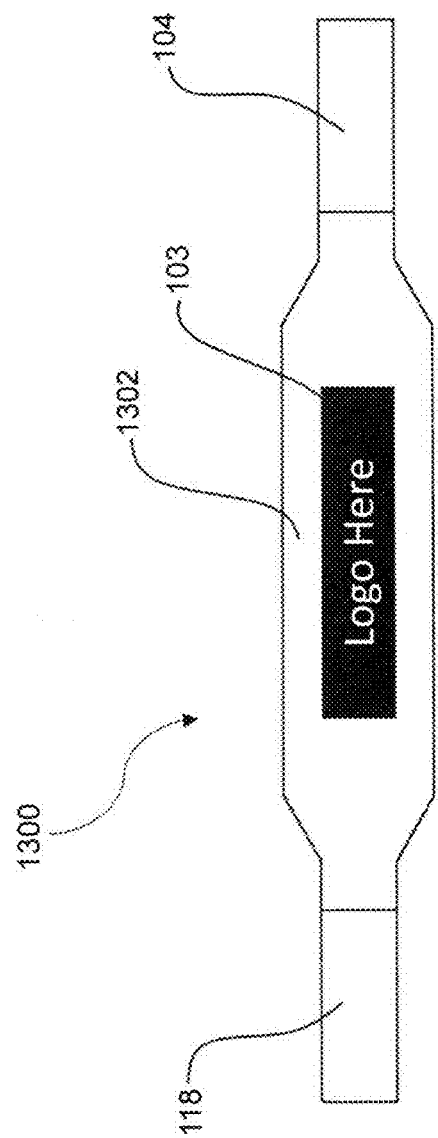
FIG. 13 is a front view of another embodiment of an elastomeric strap of the present disclosure.

In addition to the optimal embodiment for the elastomeric strap 100 described above, other embodiments are possible and could take any number of shapes. One particular embodiment would include a non-fabric, elastomeric strap formed from one or more of the elastomeric materials described above and in a shape similar to that described in FIG. 13. The features of elastomeric strap 1300 that are the same as elastomeric strap 100 use the same reference numerals. Elastomeric strap 1300 shown in FIG. 13 is the same as elastomeric strap 100, except it includes a principal center area 1302 of a different shape than strap body 102 and is made of a different material. The principal center area 1302 would be substantially wider than the optimal embodiment described above, providing additional room for printing logos. This wider print area would be up to approximately 1 inch in width and taper down to approximately ½ inch near the ends to fit through camera port 300 and the ports at the bottom of the smartphone case. A hook and loop closure system would be fastened at each end, which are the same as or similar to first fastener 104 and second fastener 108 of elastomeric strap 100, to serve the features described earlier, including, without limitation, comfort, adjustability, quick/easy installation and removal, etc. The principle advantage of this wider elastomeric strap 1300 is the enlarged printing area for larger, more complex, and/or multiple line logos. Various manufacturing processes could be used to produce this elastomeric strap 1300, fabricated from the non-fabric elastomeric materials described above, including molding, extrusion, punching, pressing, or stamping out of large sheets of material, etc. Alternatively, with elastomeric strap 1300, a hook and loop closure system might be formed into each end as part of the manufacturing process depending on the material used and the method of manufacture.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A method for infiltrating a substance into a heterogeneous solid of a material of an elastomeric strap having a strap body to form a logo, said method comprising:
   infusing colored dyes into an interior of fibers of the strap body by providing a permeating substance and a heterogeneous solid of the elastomeric strap, the heterogeneous solid comprising a first region, a second region, and an interface region interposed between the first region and the second region;
   applying an energy to the heterogeneous solid, the energy of an amount sufficient to render the interface region temporarily permeable;

applying a driving force configured to infiltrate the permeating substance into the interface region to form the logo; and modifying the application of the energy, thereby rendering the interface region impermeable and causing a portion of the permeating substance to disperse into the first region.

2. The method of claim 1, wherein the first region comprises an amorphous solid and the second region comprises an at least semi-crystalline solid.

3. The method of claim 1, wherein the heterogeneous solid comprises a natural or synthetic polymer.

4. The method of claim 1, wherein the heterogeneous solid comprises a fiber.

5. The method of claim 1, wherein the permeating substance comprises a dye or other colorant.

6. The method of claim 1, wherein the energy comprises heat.

7. The method of claim 1, wherein the energy comprises electromagnetic radiation.

8. The method of claim 7, wherein the energy comprises infrared radiation.

9. The method of claim 1, wherein the amount of energy is within a Boson peak region of the heterogeneous solid.

10. The method of claim 1, wherein the driving force comprises capillary action.

11. The method of claim 1, wherein the driving force comprises a ripplon.

12. The method of claim 1, wherein the interface region is rendered permeable by the formation of one or more tunnels.

13. The method of claim 1, further comprising the step of applying at least a partial vacuum while the energy is applied.

14. An elastomeric strap connectable to a case of a mobile device comprising:
a strap body having a logo, the strap body having a heterogeneous solid comprising a first region, a second region, and an interface region interposed between the first region and the second region, the logo being printed on the strap body by infusing colored dyes into an interior of fibers of the strap body to minimize or eliminate deformation of the logo upon stretch of the strap body so that the logo remains visibly identifiable or recognizable during use and non-use, by a permeating substance lying within the first region and the interface region of the strap body forming the logo and with the permeating substance being introduced into the interface region by applying an energy configured to render the interface region temporarily permeable, the strap body having a first end and a second end that is opposite to the first end;
a first fastener connected to strap body at the first end; and
a second fastener connected to strap body at the second end, the first fastener mates with the second fastener to form a loop around the case of the mobile device.

15. The elastomeric strap of claim 14, wherein the first fastener mates with the second fastener by hook and loop fasteners to form the loop around the case of the mobile device.

16. The elastomeric strap of claim 14, wherein the first region comprises an amorphous solid and the second region comprises an at least semi-crystalline solid.

17. The elastomeric strap of claim 14, wherein the energy is selected to lie within a Boson peak region of the heterogeneous solid.

18. The elastomeric strap of claim 14, wherein the heterogeneous solid comprises a natural or synthetic polymer.

19. The elastomeric strap of claim 14, wherein the heterogeneous solid comprises a fiber.

20. The elastomeric strap of claim 14, wherein the permeating substance comprises a dye or other colorant.

21. The elastomeric strap of claim 14, wherein the strap body is comprised of a composite solid that is resistant to chemical bleaching.

* * * * *